United States Patent
Marcone et al.

(10) Patent No.: US 10,912,040 B2
(45) Date of Patent: Feb. 2, 2021

(54) IN-BAND EMISSION INTERFERENCE MANAGEMENT

(71) Applicant: QUALCOMM Incorporated, San Diego, CA (US)

(72) Inventors: Alessio Marcone, Nuremberg (DE); Marco Papaleo, Bologna (IT); Valentin Alexandru Gheorghiu, Tokyo (JP); Sumant Jayaraman Iyer, San Diego, CA (US); Timo Ville Vintola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 16/218,258

(22) Filed: Dec. 12, 2018

(65) Prior Publication Data
US 2020/0196250 A1 Jun. 18, 2020

(51) Int. Cl.
*H04W 52/32* (2009.01)
*H04L 5/00* (2006.01)
(Continued)

(52) U.S. Cl.
CPC ......... *H04W 52/325* (2013.01); *H04L 5/0039* (2013.01); *H04W 52/243* (2013.01); *H04W 52/365* (2013.01); *H04W 52/367* (2013.01)

(58) Field of Classification Search
CPC ............. H04W 52/325; H04W 52/243; H04W 52/367; H04W 52/365; H04L 5/0039
See application file for complete search history.

(56) References Cited

U.S. PATENT DOCUMENTS

| 2004/0097223 A1* | 5/2004 | Bellec | H04W 36/30 |
| | | | 455/422.1 |
| 2006/0067269 A1* | 3/2006 | Jugl | H04W 72/121 |
| | | | 370/329 |

(Continued)

FOREIGN PATENT DOCUMENTS

WO    WO-2015119552 A1    8/2015

OTHER PUBLICATIONS

International Search Report and Written Opinion—PCT/US2019/061110—ISA/EPO—dated Feb. 28, 2020.
(Continued)

*Primary Examiner* — Mohammad S Anwar
(74) *Attorney, Agent, or Firm* — Holland & Hart LLP

(57) ABSTRACT

Methods, systems, and devices for wireless communications are described. A base station may determine an emissions mask (e.g., an in-band emission (IBE) mask) for a user equipment (UE) which may be determined based on the total number of UEs scheduled by the base station for uplink transmissions during a same transmission time interval (TTI). The base station may transmit downlink control information (DCI) to the UE indicating the emissions mask. The base station may additionally transmit a grant to the UE allocating resources for the UE based on the UE's position relative to other UEs served by the base station. The UE may receive the DCI and may map the emissions mask to a maximum power reduction (MPR). Based on the MPR, the UE may determine a transmit power and may transmit an uplink transmission to the base station according to the transmission power and the DCI.

30 Claims, 17 Drawing Sheets

(51) Int. Cl.
*H04W 52/24* (2009.01)
*H04W 52/36* (2009.01)

(56) References Cited

U.S. PATENT DOCUMENTS

| | | | | |
|---|---|---|---|---|
| 2006/0077931 | A1* | 4/2006 | Lee | H04L 5/14 370/329 |
| 2015/0031410 | A1* | 1/2015 | Lim | H04W 52/146 455/522 |
| 2016/0037385 | A1* | 2/2016 | Boudreau | H04W 28/18 370/328 |
| 2017/0332409 | A1* | 11/2017 | Yerramalli | H04L 5/00 |
| 2018/0367270 | A1* | 12/2018 | Raghavan | H04W 72/046 |

OTHER PUBLICATIONS

Nokia, et al., "Network Controlled FR2 IBE Relaxations for Better FR2 UE MPR Performance", 3GPP Draft, 3GPP TSG-RAN WG4Meeting #89, R4-1815467 FR2 IBE Relaxation for Better MPR Performance, 3rd Generation Partnership Project (3GPP), Mobile Competence Centre, 650, Route Des Lucioles, F-06921 Sophia-Antipolis Cedex, F, vol. RAN WG4, No. Spokane, USA, 20181112-20181116, Nov. 2, 2018 (Nov. 2, 2018), XP051484098, 2 pages, Retrieved from the Internet: URL: http://www.3gpp.org/ftp/tsg%5Fran/wG4%5FRadio/TSGR4%5F89/Docs/R4%2D1815467%2Ezip. [retrieved on Nov. 2, 2018] the whole document.

Qualcomm Incorporated: "Network performance analysis for UE IBE relaxation in FR2", 3GPP Draft, 3GPP TSG-RAN WG4 #88, R4-1811039 Network Performance Analysis for UE IBE Relaxation in FR2, 3rd Generation Partnership Project (3GPP), Mobile Competence Centre, 650, Route Des Lucioles, F-06921 Sophia-Antipol, vol. RAN WG4, No. Gothenburg, SW, 20180820-20180824, Aug. 10, 2018 (Aug. 10, 2018), XP051579954, 7pages, Retrieved from the Internet: URL: http://www.3gpp.org/ftp/tsg%5Fran/WG4%5FRadio/TSGR4%5F88/Docs/R4%2D1811039%2Ezip. [retrieved on Aug. 10, 2018] the whole document.

\* cited by examiner

IN-BAND EMISSION INTERFERENCE MANAGEMENT

BACKGROUND

The present disclosure relates generally to wireless communications, and more specifically to in-band emission (IBE) interference management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station may schedule resources for a number of UEs. Transmissions sent over the scheduled resources may interfere with other transmissions occurring during overlapping or the same time interval. Interference among transmissions may limit an ability of a receiving device, whether a base station or UE, to decode the transmission.

SUMMARY

The described techniques relate to improved methods, systems, devices, and apparatuses that support in-band emission (IBE) interference management. Generally, the described techniques provide for a base station to determine an emissions mask (e.g., an IBE mask) for a UE. The base station may determine the emissions mask based on the total number of UEs scheduled by the base station for uplink transmissions, which may include the UE, during a same transmission time interval (TTI). The emissions mask may be proportional to the number of UEs. The base station may then transmit downlink control information (DCI) to the UE indicating the emissions mask. The base station may additionally transmit a grant to the UE allocating resources for the UE. The grant may be based on the UE's position relative to other UEs served by the base station. The UE may receive the DCI and may map the emissions mask to a maximum power reduction (MPR). Based on the MPR, the UE may determine a transmit power and may transmit an uplink transmission to the base station according to the transmission power and resources allocated to the UE by the DCI.

A method of wireless communication at a UE is described. The method may include receiving, from a base station, downlink control information that indicates an IBE mask for the UE, mapping the indicated IBE mask to a maximum power reduction, determining, based on the maximum power reduction, a transmission power for the UE, and transmitting, according to the determined transmission power and the received downlink control information, an uplink transmission to the base station.

An apparatus for wireless communication at a UE is described. The apparatus may include a processor, memory in electronic communication with the processor, and instructions stored in the memory. The instructions may be executable by the processor to cause the apparatus to receive, from a base station, downlink control information that indicates an IBE mask for the UE, map the indicated IBE mask to a maximum power reduction, determine, based on the maximum power reduction, a transmission power for the UE, and transmit, according to the determined transmission power and the received downlink control information, an uplink transmission to the base station.

Another apparatus for wireless communication at a UE is described. The apparatus may include means for receiving, from a base station, downlink control information that indicates an IBE mask for the UE, mapping the indicated IBE mask to a maximum power reduction, determining, based on the maximum power reduction, a transmission power for the UE, and transmitting, according to the determined transmission power and the received downlink control information, an uplink transmission to the base station.

A non-transitory computer-readable medium storing code for wireless communication at a UE is described. The code may include instructions executable by a processor to receive, from a base station, downlink control information that indicates an IBE mask for the UE, map the indicated IBE mask to a maximum power reduction, determine, based on the maximum power reduction, a transmission power for the UE, and transmit, according to the determined transmission power and the received downlink control information, an uplink transmission to the base station.

In some examples of the method, apparatuses, and non-transitory computer-readable medium described herein, receiving the downlink control information may include operations, features, means, or instructions for receiving downlink control information that indicates the IBE mask based on a number of UEs scheduled by the base station for uplink transmissions during a same transmission time interval.

In some examples of the method, apparatuses, and non-transitory computer-readable medium described herein, the indicated IBE mask may be proportional to the number of UEs scheduled by the base station for uplink transmissions during the same transmission time interval.

In some examples of the method, apparatuses, and non-transitory computer-readable medium described herein, receiving the downlink control information may include operations, features, means, or instructions for receiving downlink control information that indicates the IBE mask based on an estimation of a level of IBE interference for a transmission time interval of the uplink transmission proportional to a number of UEs scheduled by the base station for uplink transmissions during the transmission time interval.

In some examples of the method, apparatuses, and non-transitory computer-readable medium described herein, mapping the indicated IBE mask to the maximum power reduction may include operations, features, means, or instructions for mapping the indicated IBE mask to the maximum power reduction according to a predetermined mapping.

In some examples of the method, apparatuses, and non-transitory computer-readable medium described herein, receiving the downlink control information further may include operations, features, means, or instructions for receiving a grant of resources for the uplink transmission.

In some examples of the method, apparatuses, and non-transitory computer-readable medium described herein, the grant of resources indicates frequency resources for the uplink transmission allocated based on a position of the UE relative to one or more other UEs.

In some examples of the method, apparatuses, and non-transitory computer-readable medium described herein, determining the transmission power for the UE may include operations, features, means, or instructions for determining the transmission power for the UE based on a maximum output power and the maximum power reduction.

In some examples of the method, apparatuses, and non-transitory computer-readable medium described herein, the uplink transmission includes a multi-user uplink transmission.

A method of wireless communication at a base station is described. The method may include determining an IBE mask for a UE, the UE being one of a set of UEs to be scheduled by the base station for uplink transmissions during a transmission time interval and transmitting, to the UE, downlink control information that indicates the determined IBE mask for an uplink transmission by the UE.

An apparatus for wireless communication at a base station is described. The apparatus may include a processor, memory in electronic communication with the processor, and instructions stored in the memory. The instructions may be executable by the processor to cause the apparatus to determine an IBE mask for a UE, the UE being one of a set of UEs to be scheduled by the base station for uplink transmissions during a transmission time interval and transmit, to the UE, downlink control information that indicates the determined IBE mask for an uplink transmission by the UE.

Another apparatus for wireless communication at a base station is described. The apparatus may include means for determining an IBE mask for a UE, the UE being one of a set of UEs to be scheduled by the base station for uplink transmissions during a transmission time interval and transmitting, to the UE, downlink control information that indicates the determined IBE mask for an uplink transmission by the UE.

A non-transitory computer-readable medium storing code for wireless communication at a base station is described. The code may include instructions executable by a processor to determine an IBE mask for a UE, the UE being one of a set of UEs to be scheduled by the base station for uplink transmissions during a transmission time interval and transmit, to the UE, downlink control information that indicates the determined IBE mask for an uplink transmission by the UE.

In some examples of the method, apparatuses, and non-transitory computer-readable medium described herein, determining the IBE mask for the UE may include operations, features, means, or instructions for identifying a number of the set of UEs to be scheduled by the base station during the transmission time interval, and determining the IBE mask for the UE based on the identified number.

In some examples of the method, apparatuses, and non-transitory computer-readable medium described herein, the IBE mask may be proportional to the number of the set of UEs to be scheduled by the base station during the transmission time interval.

In some examples of the method, apparatuses, and non-transitory computer-readable medium described herein, determining the IBE mask for the UE may include operations, features, means, or instructions for estimating a level of IBE interference during the transmission time interval proportional to a number of the set of UEs scheduled by the base station for uplink transmissions during the transmission time interval, and determining the IBE mask for the UE based on the estimated level of IBE interference.

Some examples of the method, apparatuses, and non-transitory computer-readable medium described herein may further include operations, features, means, or instructions for allocating frequency resources for the UE based on a position of the UE relative to at least one of the set of UEs, where the transmitted downlink control information indicates the allocated frequency resources.

Some examples of the method, apparatuses, and non-transitory computer-readable medium described herein may further include operations, features, means, or instructions for identifying, from the set of UEs, a set of UEs associated with a receive beam of the base station, the UE being one of the set of UEs, and allocating frequency resources for the UE that may be non-contiguous with frequency resources allocated to any other UE of the set of UEs.

In some examples of the method, apparatuses, and non-transitory computer-readable medium described herein, each UE of the set of UEs may be allocated frequency resources that may be non-contiguous with frequency resources allocated for any other UE of the set of UEs.

Some examples of the method, apparatuses, and non-transitory computer-readable medium described herein may further include operations, features, means, or instructions for identifying that the UE and a second UE of the set of UEs may be separated by an angular distance that may be less than or equal to a threshold angular distance, and allocating, based on the identification, first frequency resources for the UE that may be non-contiguous with second frequency resources allocated for the second UE.

Some examples of the method, apparatuses, and non-transitory computer-readable medium described herein may further include operations, features, means, or instructions for identifying that the UE and a second UE of the set of UEs may be separated by an angular distance that may be greater than or equal to a threshold angular distance, and allocating, based on the identification, first frequency resources for the UE that may be contiguous with second frequency resources allocated for the second UE.

DETAILED DESCRIPTION

Figure 1:
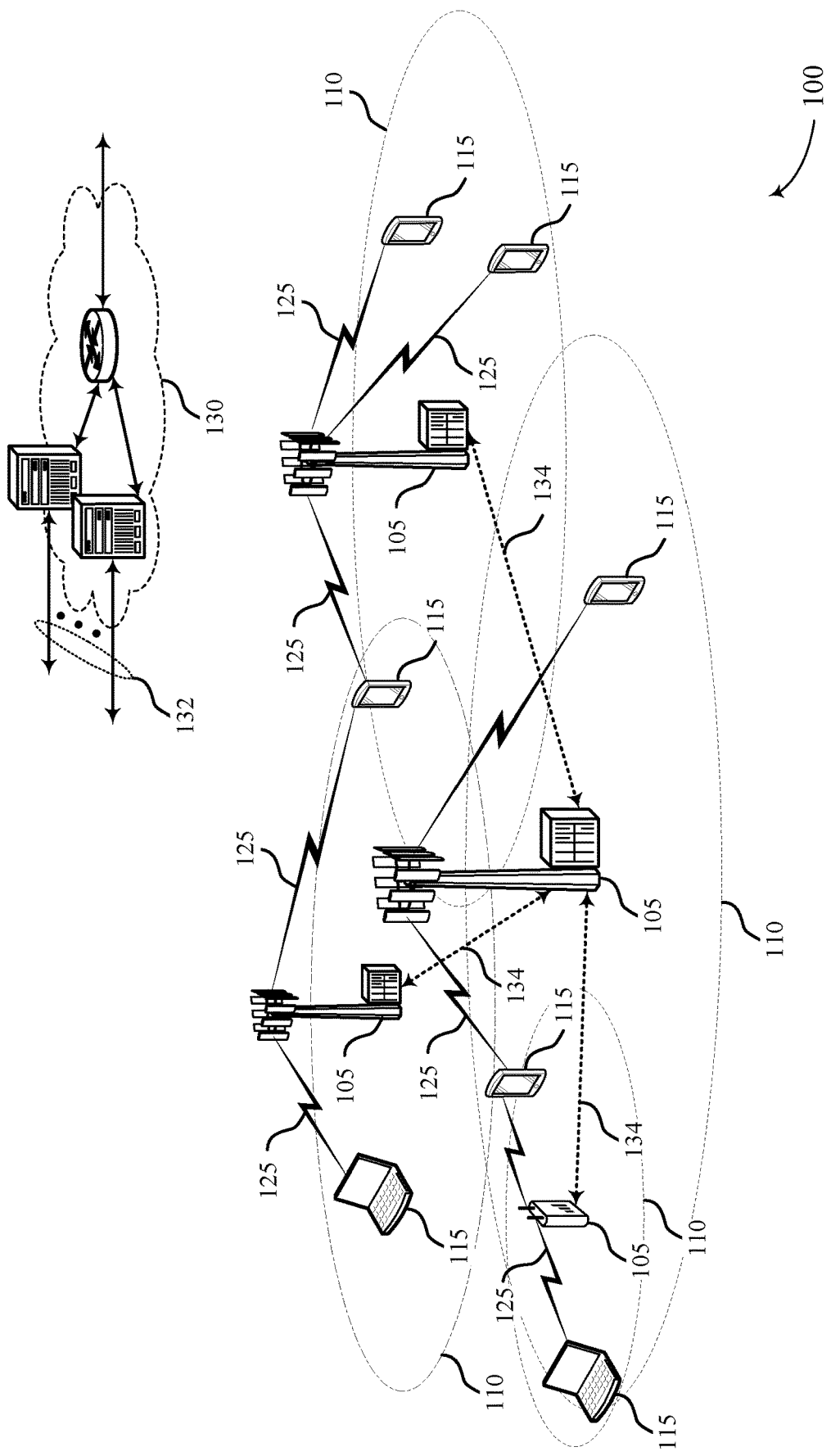
FIG. 1 illustrates an example of a wireless communications system that supports in-band emission (IBE) interference management in accordance with aspects of the present disclosure.

Transmissions from a user equipment (UE) to a base station may be associated with an output power value. In some cases, the output power value may be limited by one or more emissions masks. A UE may use such emissions masks to limit or mitigate various parameters associated with interference, such as adjacent channel leakage ratio (ACLR), spectrum emission mask (SEM), error vector magnitude (EVM), and in-band emissions (IBEs). IBEs may be calculated as the ratio of the UE output power in non-allocated resource blocks (RBs) (e.g., in one slot, subframe, or other time interval) to the UE output power in an allocated RB (e.g., in the same slot, subframe, or other time interval). The power in such non-allocated RBs may be generated by odd-order non-linearities of power amplifiers (PAs). Interference from IBEs may be significant in coverage areas with a high density of UEs, when a base station is serving multiple UEs simultaneously with one or more beams, when UEs transmit within the same band, but in separate frequency resources, of the band, or some combination of these scenarios.

In some cases, IBE interference may be mitigated by scheduling uplink transmissions from UEs according to their positions relative to each other, the base station performing scheduling, and/or the coverage area of the base station performing scheduling. For instance, UEs may be scheduled according to whether they make up spatially proximal or spatially isolated UE pairs with other UEs to be scheduled. A spatially proximal UE pair may refer to two UEs that are within a threshold distance relative to each other, have a path loss between them less than a threshold path loss value, have an angular distance between them relative to a serving base station less than an angular distance threshold value, are both served by a same serving beam of the serving base station (e.g., the UEs may be co-beamed UEs), are each served by individual beams that interference with each other to a degree greater than a threshold, or are in a combination of these situations. A spatially isolated UE pair may refer to two UEs that are outside of a threshold distance from each other, have a path loss with each other greater than a threshold path loss value, have an angular distance with each other relative to the serving base station greater than an angular distance threshold value, are served by separate serving beams with levels of interference between the beams less than a threshold, or are in a combination of these situations. In general, a base station may schedule uplink resources of two UEs that make up spatially proximal UE pairs on non-contiguous frequency resources, which may lower IBE interference from an uplink transmission of one UE into the resource of an uplink transmission of the other UE. Additionally, a base station may schedule uplink resources for UEs making up a spatially isolated UE pair on contiguous frequency resources.

Additionally or alternatively, IBE interference may be mitigated by adjusting a emissions mask (e.g., an IBE mask) according to a number of UEs to be scheduled (e.g., a number of UEs to be scheduled for uplink transmissions). For instance, a base station may choose an IBE mask for each UE to be scheduled and may transmit the mask or information related to the mask to the UE. The UE may determine a maximum power reduction (MPR) based on the IBE mask, and may decrease its maximum output power accordingly to determine its transmission power. In some cases, the emissions mask may be described in terms of ACLR, SEM, EVM, and/or IBE, among which IBE may be most stringent, and may be calculated as shown in Equation 1 as:

$$\max\left[-25-10.\log\left(\frac{N_{RB}}{L_{CRB}}\right),\right. \tag{1}$$
$$\left. 20\log(EVM)-5.\frac{(|\Delta_{RB}|-1)}{L_{CRB}},-55.1\text{ dBm}-P_{RB}\right]$$

In some cases, MPR may reduce interference to other transmitting device, such as IBE interference when multiple UEs transmit in uplink during the same time slot.

Aspects of the disclosure are initially described in the context of a wireless communications system. Examples of an additional wireless communications system, a transmission scheme, and a process flow are then provided to illustrate additional aspects of the disclosure. Aspects of the disclosure are further illustrated by and described with reference to apparatus diagrams, system diagrams, and flowcharts that relate to IBE interference management.

FIG. 1 illustrates an example of a wireless communications system 100 that supports IBE interference management in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying predetermined or calculated amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support efficient techniques for enabling IBE interference management. For example, a base station 105 may determine an IBE mask for a UE 115, where the UE 115 is one of a set of UEs 115 to be scheduled by the base station for uplink transmissions during a TTI. The UE 115 may receive, from a base station 105, downlink control information (DCI) that indicates an IBE mask for the UE 115. The UE 115 may map the indicated IBE mask to an MPR. The UE 115 may determine a transmission power for the UE 115 based on the MPR. The UE 115 may transmit an uplink transmission to the base station based on the determined transmission power and the received DCI.

Figure 2:
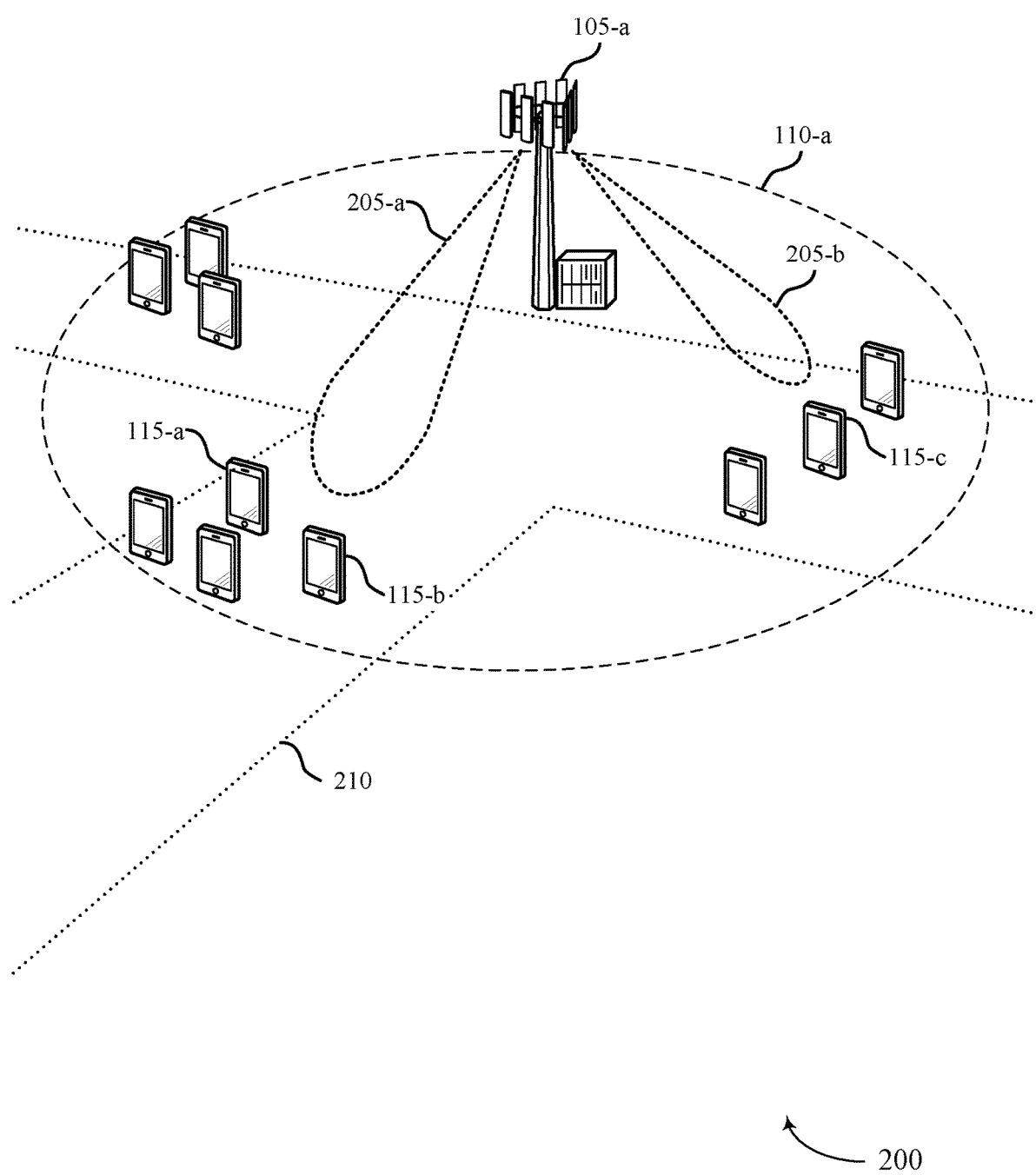
FIG. 2 illustrates an example of a wireless communications system that supports IBE interference management in accordance with aspects of the present disclosure.

FIG. 2 illustrates an example of a wireless communications system 200 that supports IBE interference management in accordance with aspects of the present disclosure. In some examples, wireless communications system 200 may implement aspects of wireless communications system 100. Wireless communications system 200 may include base station 105-*a* and UEs 115-*a*, 115-*b*, and 115-*c*, which may be examples of a base station 105 and UEs 115, respectively, as described herein with reference to FIG. 1. UEs 115-*a* and 115-*b* may make up a spatially proximal UE pair. For instance, UEs 115-*a* and 115-*b* may be within a threshold distance relative to each other, have a path loss between them less than a threshold path loss value, have a small angular distance between them relative to base station 105-*a*, may both be served by a serving beam 205-*a* of base station 105 (e.g., UE 115-*a* and 115-*b* may be co-beamed UEs 115), or may be in a combination of these situations. Meanwhile, UE 115-*c* may make up spatially isolated UE pairs with UE 115-*a* and UE 115-*b*. For instance, UE 115-*c* may be outside of a threshold distance from UEs 115-*a* and/or 115-*b*, have a path loss with UEs 115-*a* and/or 115-*b* greater than a threshold path loss value, have a large angular distance with UEs 115-*a* and/or 115-*b* relative to base station 105-*a*, may not be served by the same serving beam 205 (e.g., UEs 115-*a* and/or 115-*b* may be served by serving beam 205-*a* and UE 115-*c* may be served by serving beam 205-*b*), or may be in a combination of these situations.

In some cases, a base station 105-*a* may schedule multiple UEs 115 (e.g., UEs 115-*a*, 115-*b*, and 115-*c*) for uplink transmissions over resources spanning a same TTI, but different frequency resources. The different frequency resources may or may not be in the same frequency band. In some cases, interference (e.g., IBE interference) associated with simultaneous uplink transmissions may exceed a tolerable threshold. For instance, base station 105-*a* may be operating in an environment with a high-density hotspot (e.g., a city block 210 with a high number of UEs 115) and may serve multiple UEs 115 simultaneously with one or more serving beams 205 (e.g., serving beams 205-*a* and 205-*b*). In cases where multiple UEs 115 transmit simultaneously in the same band, but on different frequency resources, excessive interference (e.g., interference, such as IBE interference, above a threshold value) may limit effective communication between base station 105-*a* and the multiple UEs 115.

Upon being scheduled, UEs 115-*a*, 115-*b* and 115-*c* may transmit over respective frequency resources to base station 105-*a*. If UEs 115 of a spatially proximal pair (e.g., UE 115-*a* and UE 115-*b*) transmit under the same TTI, their transmissions may interfere with each other to a greater degree (e.g., be associated with a greater IBE interference) than those of UEs 115 of a spatially isolated pair (e.g., UE 115-*a* with UE 115-*c* and/or UE 115-*b* with UE 115-*c*). This increase in interference, which may become excessive, may be due to the close proximity of UEs 115 of spatially proximal UE pairs relative to each other, which may be small enough to enable both UEs 115 of the spatially proximal UE pair to be served by a single serving beam 205 (e.g., serving beam 205-*a*). In general, IBE interference may be higher between UEs 115 that are scheduled in contiguous frequency resources (e.g., adjacent frequency resources or frequency resources that share a border) than between UEs 115 that are separated by a frequency gap, which may include a number of frequency resources. As such, if UEs 115 transmit to base station 105-*a* in the same TTI on contiguous frequency resources, a greater amount of IBE interference may result, which may be degrading to system performance.

To mitigate interference, base station 105-*a* may schedule the UEs 115 according to a correlation between frequency allocation of UEs 115 and position of such UEs 115 within a cell or geographic coverage area 110 (e.g., geographic coverage area 110-*a*). For instance, base station 105-*a* may schedule the UEs 115 based on whether the UEs 115 make up spatially proximal UE pairs or spatially isolated UE pairs with other UEs. More specifically, base station 105-*a* may determine frequency resources for scheduled transmissions within the same TTI based on whether the UEs 115 make up spatially proximal UE pairs or spatially isolated UE pairs. For instance, UEs 115 making up a spatially proximal UE pair may be scheduled in non-contiguous frequency resources and/or UEs 115 making up a spatially isolated UE pair may be scheduled in contiguous frequency resources. In some cases, UEs 115 that make up a spatially isolated pair (e.g., UEs 115-*a* with UE 115-*c* and UE 115-*b* with UE 115-*c*) with other UEs 115 that together make up a spatially proximal UE pair (e.g., UEs 115-*a* with UE 115-*b*) may have their frequency resources sandwiched between those of the other UEs 115.

For instance, UE 115-*c* may not be in serving beam 205-*a*, but UEs 115-*a* and 115-*b* may be in serving beam 205-*a*. As such, UEs 115-*a* and 115-*c*, as well as UEs 115-*b* and 115-*c*, may make up spatially isolated UE pairs and UEs 115-*a* and 115-*b* may make up a spatially proximal pair. In such a case, frequency resources of UE 115-*c* that occur within the same TTI as frequency resources of UEs 115-*a* and 115-*b* may be between a frequency resource of UE 115-*a* and a frequency resource of UE 115-*b*. Frequency resources that are non-contiguous or non-adjacent with each other, such as that of UEs 115-*a* and 115-*b* in the present example, may be referred to as frequency isolated frequency resources. Frequency isolated frequency resources may have one or more frequency resources between them, which may be unallocated or allocated for other device (e.g., UE 115-*c*) or uses. Frequency isolation may effectively limit interference where two UEs 115 are not spatially isolated UE pairs (e.g., when two UEs 115 are spatially proximal UE pairs), and the spatial characteristics of UEs 115 that are spatially isolated UE pairs may effectively limit interference. Additionally, base station 105-*a* may use multi-antenna beamforming or coupling-loss information to enable protection against interference.

In some cases, UEs 115 that make up spatially isolated UE pairs with other UEs 115 may still produce interference with transmissions from the other UEs 115 when both are transmitted over the same TTI. For example, IBE interference may still occur among UEs 115 that make up a spatially isolated UE pair but share contiguous frequency resources. In such cases, base station 105-*a* may mitigate interference (e.g., IBE interference) by using proper beamforming weights along serving beam 205-*b*, which may reduce or at least partially annul interference coming from transmissions received along serving beam 205-*a* (by UEs 115-*a* and/or 115-*b*). Base station 105-*a* may, additionally or alternatively, mitigate such interference by using proper beamforming weights along serving beam 205-*a*, which may reduce or at least partially annul interference coming from transmissions received along serving beam 205-*b* (e.g., by UE 115-*c*). In either or both cases, zero-forcing beamforming may be used.

In some cases, interference (e.g., IBE interference) may be mitigated by adjusting an emissions mask (e.g., an IBE mask) according to a number of UEs 115 to be scheduled. In one example, base station 105-*a* may adjust a single emissions mask proportionally to a total number of UEs 115 served by base station 105-*a* (e.g., 3 in the present example) and may have all UEs 115 use the same mask. In another example, base station 105-*a* may have a different emissions mask for each serving beam 205, where each emissions mask is chosen proportionally to the total number of UEs 115 within a particular serving beam 205. For instance, a first emissions mask proportional to the number of UEs 115 within serving beam 205-*a* (e.g., 2 in the present example) and a second emissions mask proportional to the number of UEs 115 within serving beam 205-*b* (e.g., 1 in the present example) may be chosen. Each UE 115 within serving beam 205-*a* (e.g., UEs 115-*a* and 115-*b*) may use the first emissions mask and each UE 115 within serving beam 205-*b* (e.g., UE 115-*c*) may use the second emissions mask. It should be noted that such methods may apply to more than two serving beams 205 as described herein without deviating from the scope of the present disclosure.

Upon adjusting the one or more emissions masks (e.g., IBE masks), as described herein or elsewhere, base station 105-*a* may transmit an indication of an emissions mask to one or more UEs 115 being served (e.g., via DCI). For instance, each UE 115 or a subset of all UEs 115 being served by base station 105-*a* may receive the same emissions mask (e.g., an emissions mask determined proportionally to the total number of UEs 115 being served by base station 105-*a*). Additionally or alternatively, each UE 115 or a subset of the total number of UEs 115 may receive emissions masks according to the serving beam 205 upon which they are being served (UEs 115-*a* and 115-*b* may receive an emissions mask corresponding to a number of UEs 115 being served by serving beam 205-*a* and UE 115-*c* may receive an emissions mask corresponding to a number of UEs 115 being served by serving beam 205-*b*). In some cases, base station 105-*a* may weight each UE 115 (e.g., according to individual UE characteristics) and base station 105-*a* may determine an emissions mask based on a combination of these weights (e.g., on a per-cell or per-beam basis).

Each UE 115 may use its respective emissions mask to determine an MPR. In some cases, each level of interference (e.g., IBE interference) may correspond to an MPR level. In some cases, the mapping between IBE interference and MPR may be preconfigured (e.g., the mapping may be known by each UE 115 a-priori) However, it should be noted that, in some cases, base station 105-*a* may directly signal the MPR value each UE 115 is to use. MPR may correspond to a maximum allowed reduction in transmit power of a UE 115 and may, for instance, refer to a maximum allowed reduction relative to a maximum output power of a UE 115. UEs 115 operating according to the MPR may transmit information according to a limited output power that may mitigate interference. In some cases, utilizing MPR may reduce interference to other transmitting devices.

Shifting (e.g., dynamically or otherwise over time) MPR according to a number of UEs may enable improved or otherwise more optimal network performance over static MPR by limiting interference when a high number of UEs 115 are being served, which may increase decoding efficiency (e.g., information may be decoded more easily when there is less interference). Additionally or alternatively, dynamically shifting MPR according to a number of UEs may enable more optimal network performance over static MPR by enabling an increase in maximum output power when a low number of UEs 115 are being served, which may also increase decoding efficiency and/or increase the range a UE 115 may travel from base station 105-*a* and still maintain communication with base station 105-*a*. Enabling each UE 115 to use the same adjusted emissions mask according to a total number of UEs 115 being served may reduce (e.g., minimize) computational complexity. Enabling each UE 115 to use an adjusted emissions mask according to the number of UEs 115 being served on the same serving beam 205 as the UE 115 may reduce interference along one or more of the individual serving beams 205. In some cases, base stations 105 utilizing multi-antenna beamforming techniques may more effectively assign frequency resources to UEs 115 based on the position of the UEs 115 than base stations 105 utilizing single-antenna beamforming techniques or not utilizing beamforming techniques at all. In some cases, scheduling resources according to the position of UEs 115 within cells may enable more effective interference protection over scheduling resources through means that do not consider the position of the UEs 115.

Figure 3:
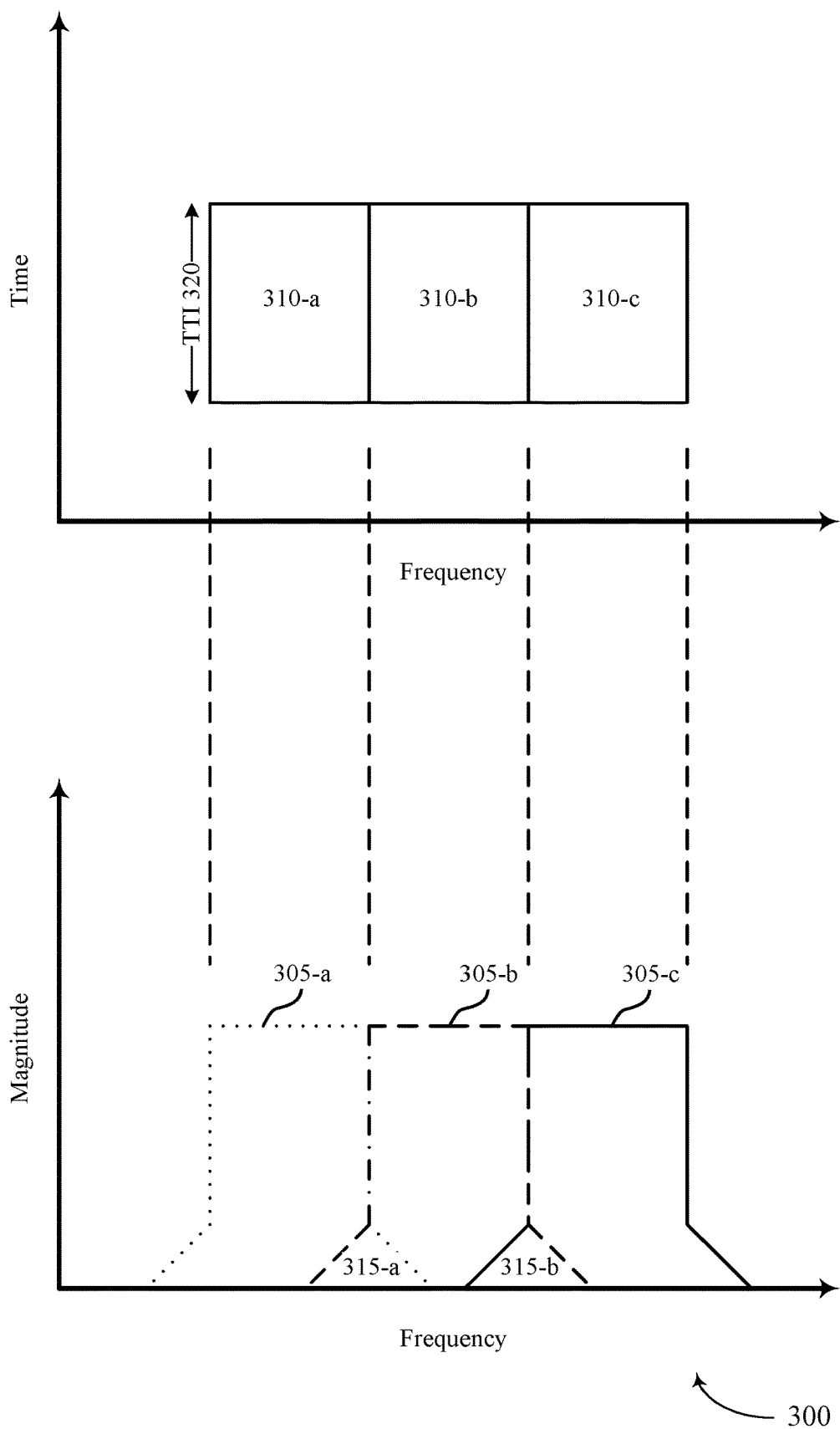
FIG. 3 illustrates an example of a transmission scheme that supports IBE interference management in accordance with aspects of the present disclosure.

FIG. 3 illustrates an example of a transmission scheme 300 that supports IBE interference management in accordance with aspects of the present disclosure. In some examples, transmission scheme 300 may implement aspects of wireless communications systems 100 and/or 200. For instance, transmission scheme 300 may be implemented by a base station 105 and a UE 115 as described with reference to FIGS. 1 and 2.

Transmission scheme 300 may include transmissions 305-*a*, 305-*b*, and 305-*c* with magnitude values (e.g., power magnitude values) as a function of frequency. Each transmission 305 may represent a signal in the frequency domain and may be directed to a same base station 105. Transmission 305-*a* may correspond to a first UE 115, transmission 305-*b* may correspond to a second UE 115, and transmission 305-*c* may correspond to a third UE 115. Each transmission 305 may correspond to a particular scheduled resource 310. For instance, the first UE 115 may transmit transmission 305-*a* primarily within a scheduled resource 310-*a*, the second UE 115 may transmit transmission 305-*b* primarily within a scheduled resource 310-*b* and the third UE 115 may transmit transmission 305-*c* primarily within a scheduled resource 310-*c*. Each scheduled resource 310 may span a same TTI 320.

In some cases, transmissions 305 may include overlap regions 315 in which a transmission 305 overlaps with another transmission 305. For instance, transmission 305-*a* may overlap with transmission 305-*b* in overlap region 315-*a* and transmission 305-*b* may overlap with transmission 305-*c* in overlap region 315-*b*. Overlap regions 315 may at least partially occur outside of scheduled resources 310 (e.g., in the frequency domain) associated with a particular transmission 305. For instance, overlap region 315-*a* may extend into frequencies associated with scheduled resource 310-*b*, which may be due to the first UE 115 transmitting transmission 305-*a* at least partially outside of scheduled resource 310-*a*. In general, larger overlap regions 315 may be associated with a higher level of interference. For instance, IBE interference may increase as transmission 305-*a* contributes more power in scheduled resource 310-*b*.

Interference may be mitigated by assigning UEs 115 to scheduled resources 310 according to their spatial location. For instance, if the second UE 115 makes up spatially isolated UE pairs, as described with reference to FIG. 2, with the first UE 115 and also with the third UE 115, the second UE 115 may use scheduled resource 310-*b*, which may be sandwiched in between a scheduled resource 310 associated with the first UE 115 (e.g., scheduled resource 310-*a*) and a scheduled resource 310 associated with the third UE 115 (e.g., scheduled resource 310-*c*). The second UE 115 may, additionally or alternatively, use scheduled resource 310-*b* if the first UE 115 and the third UE 115 make up a spatially proximal UE pair, as described with reference to FIG. 2. Such a scheme may provide frequency isolation for the first UE 115 and the third UE 115. If the transmissions 305 are directed to a base station 105, base station 105 may weight each transmission 305 according to the beam of the base station 105 along which they are received, which may mitigate IBE interference. Assuming the second UE 115 is on a separate beam from the first and third UEs 115, transmission 305-*b* may be weighted with a first set of weights and transmissions 305-*a* and 305-*c* may be weighted with a second set of weights.

Figure 4:
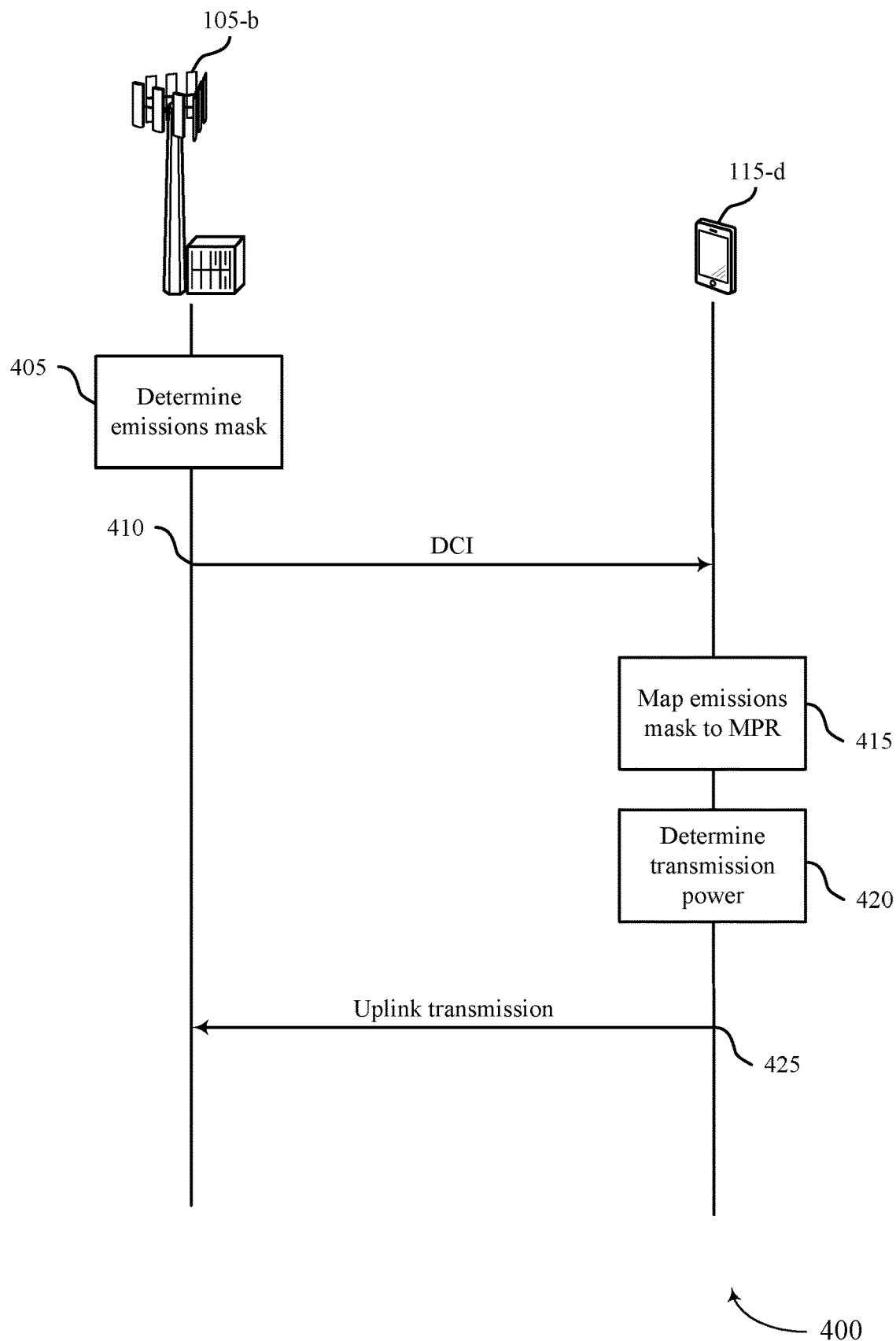
FIG. 4 illustrates an example of a process flow that supports IBE interference management in accordance with aspects of the present disclosure.

FIG. 4 illustrates an example of a process flow 400 that supports IBE interference management in accordance with aspects of the present disclosure. In some examples, process flow 400 may implement aspects of wireless communications systems 100 and/or 200. For instance, process flow 400 may include a base station 105-*b* and a UE 115-*d*, which may be examples of a base station 105 and a UE 115, respectively, as described herein with reference to FIGS. 1 and 2.

At 405, base station 105-*b* may determine an emissions mask (e.g., an IBE mask) for UE 115-*d*. UE 115-*d* may be one of a set of UEs 115-*d* scheduled by base station 105-*b* for uplink transmissions during a TTI. In some cases, base station 105-*b* may determine the emissions mask based on the number of UEs 115 scheduled for uplink transmissions during the TTI. In some cases, the emissions mask may be proportional to the number of UEs 115. In some cases, the emissions mask may be determined based on an estimation of a level of IBE interference for the TTI.

At 410, base station 105-*b* may transmit a DCI indicating the emissions mask for an uplink transmission by at least UE 115-*d*. The DCI may be sent along with a grant of resources for the uplink transmission by UE 115-*d* which may indicate frequency resources for the uplink transmission based on a position of UE 115-*d* relative to other UEs 115. In some cases, the indicated frequency resources may be used by multiple UEs 115 associated with a single receive beam of base station 105-*b*, which may or may not include UE 115-*d*. The frequency resources used by such multiple UEs 115 may be non-contiguous with each other. Additionally, frequency resources associated with UEs 115 that have an angular distance relative to base station 105-*b* less than a threshold (e.g., a predetermined threshold) may be non-contiguous and frequency resources associated with UEs 115 that have an angular distance relative to base station 105-*b* greater than a threshold (e.g., a predetermined threshold) may be contiguous. In some cases, the uplink transmission may be a multi-user uplink transmission. UE 115-*d* may receive the DCI.

At 415, UE 115-*d* may map the indicated emissions mask to a MPR value. In some cases, the mapping may be according to a predetermined set of mappings between a set of emissions masks an MPR value.

At 420, UE 115-*d* may determine a transmission power for the uplink transmission. In some cases, UE 115-*d* may determine the transmission power based on the MPR. Additionally, UE 115-*d* may determine the transmission power based on a maximum output power of UE 115-*d*.

At 425, UE 115-*d* transmit the uplink transmission during the scheduled TTI. The uplink transmission may be transmitted according to the determined transmission power and/or the received DCI and may be received by base station 105-*b*.

Figure 5:
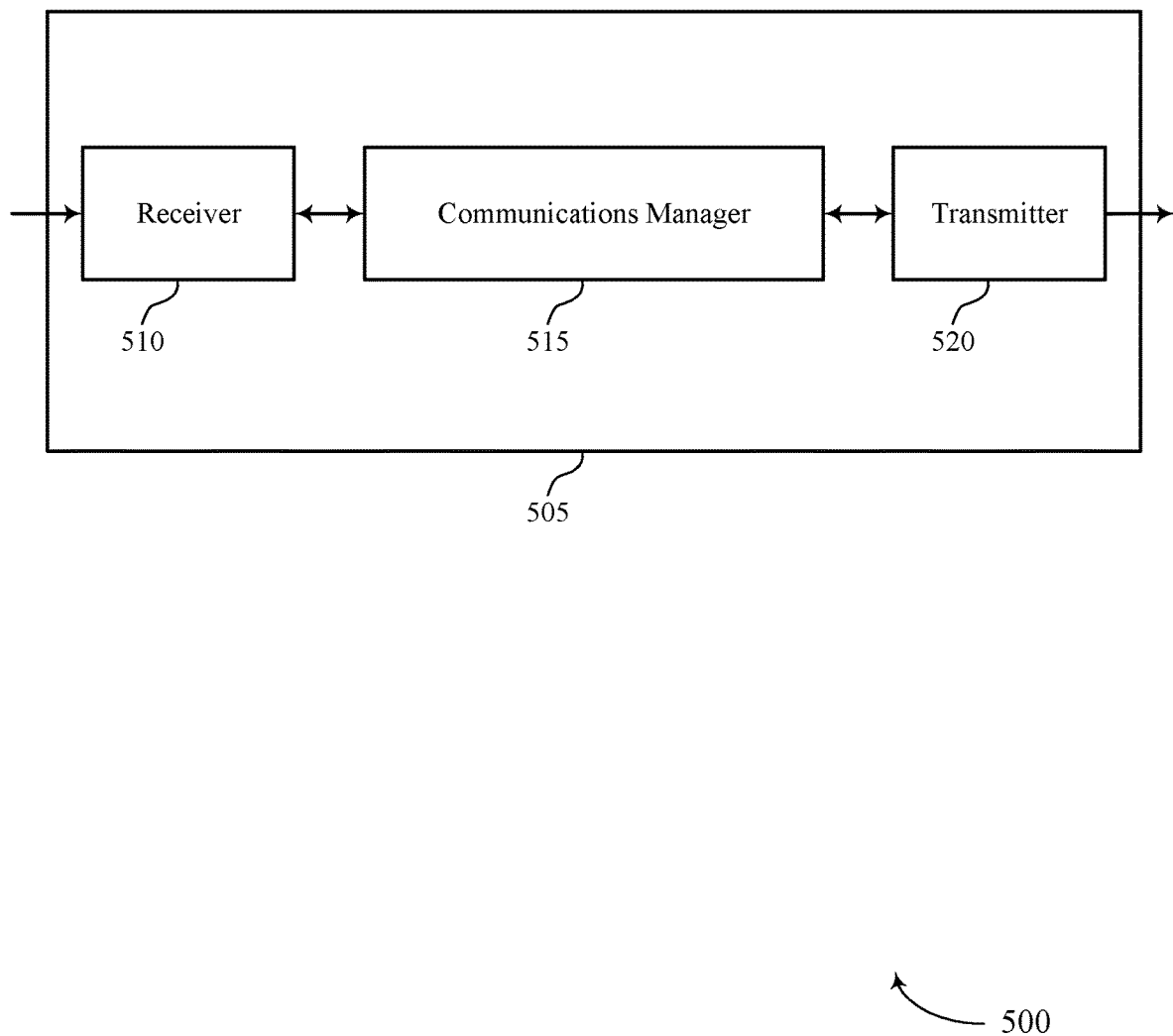
FIGS. 5 and 6 show block diagrams of devices that support IBE interference management in accordance with aspects of the present disclosure.

FIG. 5 shows a block diagram 500 of a device 505 that supports IBE interference management in accordance with aspects of the present disclosure. The device 505 may be an example of aspects of a UE 115 as described herein. The device 505 may include a receiver 510, a communications manager 515, and a transmitter 520. The device 505 may also include one or more processors, memory coupled with the one or more processors, and instructions stored in the memory that are executable by the one or more processors to enable the one or more processors to perform the interference management features discussed herein. Each of these components may be in communication with one another (e.g., via one or more buses).

The receiver 510 may receive information such as packets, user data, or control information associated with various information channels (e.g., control channels, data channels, and information related to IBE interference management, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station 105, DCI that indicates an IBE mask for the UE 115, map the indicated IBE mask to a MPR, determine, based on the MPR, a transmission power for the UE 115, and transmit, according to the determined transmission power and the received DCI, an uplink transmission to the base station 105. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The processor may be coupled with memory and execute instructions stored in the memory that enable the processor to perform or facilitate the interference management features discussed herein.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
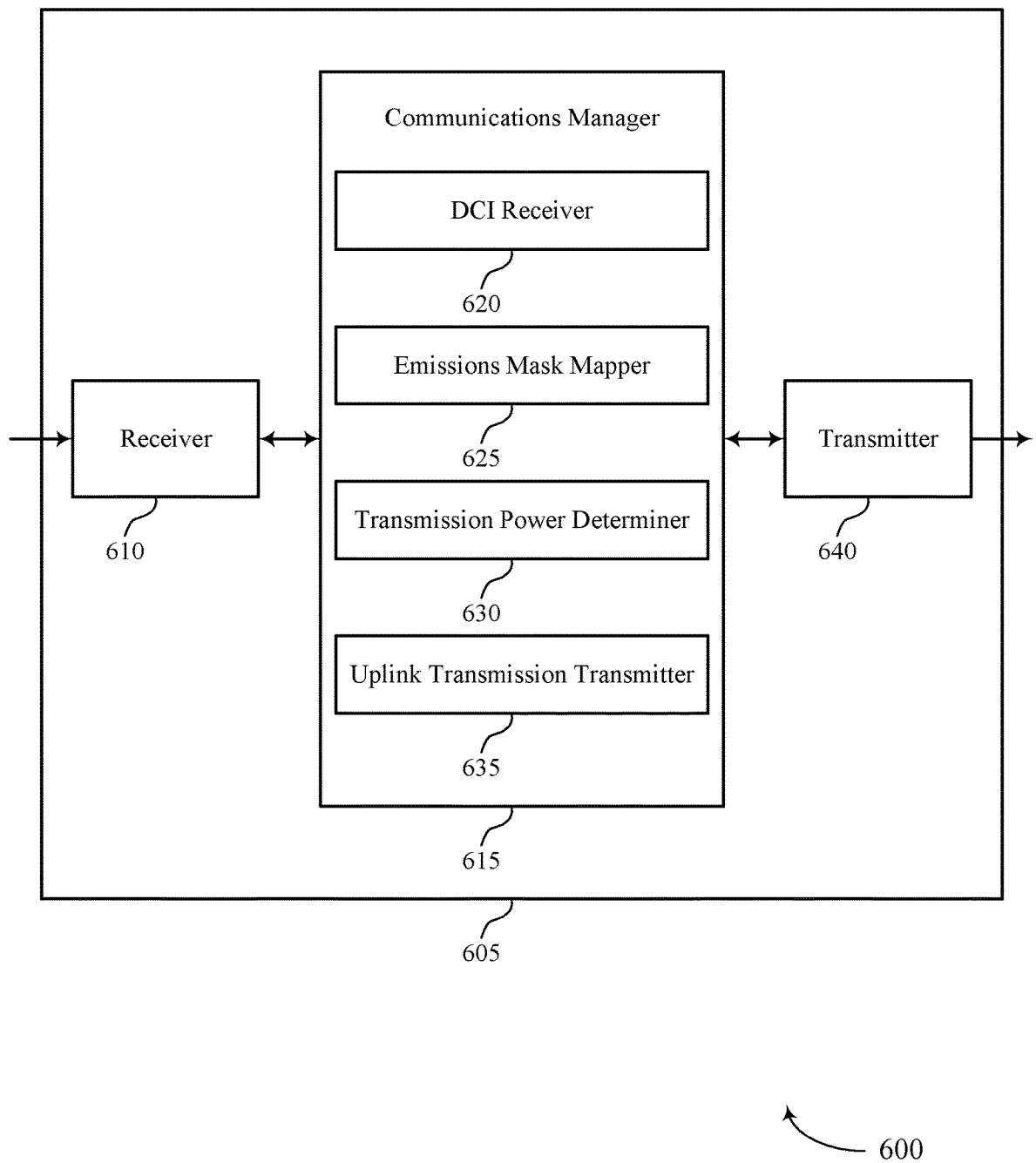

FIG. 6 shows a block diagram 600 of a device 605 that supports IBE interference management in accordance with aspects of the present disclosure. The device 605 may be an example of aspects of a device 505, or a UE 115 as described herein. The device 605 may include a receiver 610, a communications manager 615, and a transmitter 640. The device 605 may also include one or more processors. Each of these components may be in communication with one another (e.g., via one or more buses).

The receiver 610 may receive information such as packets, user data, or control information associated with various information channels (e.g., control channels, data channels, and information related to IBE interference management, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a DCI receiver 620, an emissions mask mapper 625, a transmission power determiner 630, and an uplink transmission transmitter 635. The communications manager 615 may be an example of aspects of the communications manager 810 described herein. In some cases, the communications manager 615 may be a processor. The processor may be coupled with memory and execute instructions stored in the memory that enable the processor to perform or facilitate the interference management features discussed herein.

The DCI receiver 620 may receive, from a base station 105, DCI that indicates an IBE mask for the UE 115. In some cases, the DCI receiver 620 may be a processor (e.g., a transceiver processor, or a radio processor, or a receiver processor). The processor may be coupled with memory and execute instructions stored in the memory that enable the processor to perform or facilitate the interference management features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

The emissions mask mapper 625 may map the indicated IBE mask to a MPR. In some cases, the emissions mask mapper 625 may be a processor. The processor may be coupled with memory and execute instructions stored in the memory that enable the processor to perform or facilitate the interference management features discussed herein.

The transmission power determiner 630 may determine, based on the MPR, a transmission power for the UE 115. In some cases, the transmission power determiner 630 may be a processor. The processor may be coupled with memory and execute instructions stored in the memory that enable the processor to perform or facilitate the interference management features discussed herein.

The uplink transmission transmitter 635 may transmit, according to the determined transmission power and the received DCI, an uplink transmission to the base station 105. In some cases, the uplink transmission transmitter 635 may be a processor (e.g., a transceiver processor, or a radio processor, or a transmitter processor). The processor may be coupled with memory and execute instructions stored in the memory that enable the processor to perform or facilitate the interference management features discussed herein. A transmitter processor may be collocated with and/or communicate with (e.g., direct the operations of) a transmitter of the device.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
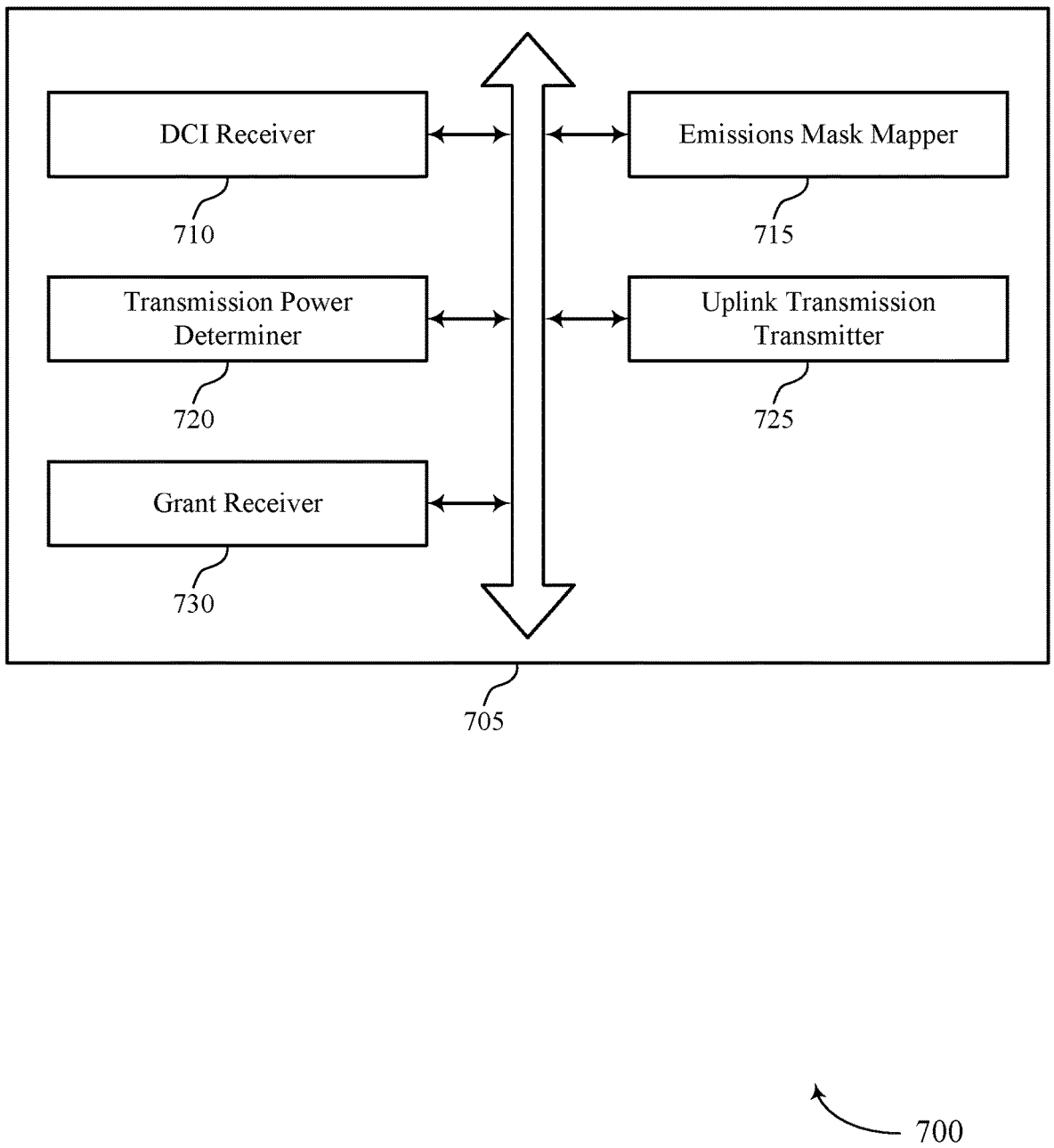
FIG. 7 shows a block diagram of a communications manager that supports IBE interference management in accordance with aspects of the present disclosure.

FIG. 7 shows a block diagram 700 of a communications manager 705 that supports IBE interference management in accordance with aspects of the present disclosure. The communications manager 705 may be an example of aspects of a communications manager 515, a communications manager 615, or a communications manager 810 described herein. The communications manager 705 may include a DCI receiver 710, an emissions mask mapper 715, a transmission power determiner 720, an uplink transmission transmitter 725, and a grant receiver 730. Each of these modules may communicate, directly or indirectly, with one another (e.g., via one or more buses). In some cases, the communications manager 705 may be a processor. The processor may be coupled with memory and execute instructions stored in the memory that enable the processor to perform or facilitate the interference management features discussed herein.

The DCI receiver 710 may receive, from a base station 105, DCI that indicates an IBE mask for the UE 115. In some examples, the DCI receiver 710 may receive DCI that indicates the IBE mask based on a number of UEs 115 scheduled by the base station 105 for uplink transmissions during a same TTI. In some examples, the DCI receiver 710 may receive DCI that indicates the IBE mask based on an estimation of a level of IBE interference for a TTI of the uplink transmission (e.g., a level of IBE interference for a TTI of the uplink transmission proportional to a number of UEs 115 scheduled by the base station 105 for uplink transmissions during the TTI). In some cases, the indicated IBE mask is proportional to the number of UEs 115 scheduled by the base station 105 for uplink transmissions during the same TTI. In some cases, the DCI receiver 710 may be a processor (e.g., a transceiver processor, or a radio processor, or a receiver processor). The processor may be coupled with memory and execute instructions stored in the memory that enable the processor to perform or facilitate the interference management features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

The emissions mask mapper 715 may map the indicated IBE mask to a MPR. In some examples, the emissions mask mapper 715 may map the indicated IBE mask to the MPR according to a predetermined mapping. In some cases, the emissions mask mapper 715 may be a processor. The processor may be coupled with memory and execute instructions stored in the memory that enable the processor to perform or facilitate the interference management features discussed herein.

The transmission power determiner 720 may determine, based on the MPR, a transmission power for the UE 115. In some examples, the transmission power determiner 720 may determine the transmission power for the UE 115 based on a maximum output power and the MPR. In some cases, the transmission power determiner 720 may be a processor. The processor may be coupled with memory and execute instructions stored in the memory that enable the processor to perform or facilitate the interference management features discussed herein.

The uplink transmission transmitter 725 may transmit, according to the determined transmission power and the received DCI, an uplink transmission to the base station 105. In some cases, the uplink transmission includes a multi-user uplink transmission. In some cases, the uplink transmission transmitter 725 may be a processor (e.g., a transceiver processor, or a radio processor, or a transmitter processor). The processor may be coupled with memory and execute instructions stored in the memory that enable the processor to perform or facilitate the interference management features discussed herein. A transmitter processor may be collocated with and/or communicate with (e.g., direct the operations of) a transmitter of the device.

The grant receiver 730 may receive a grant of resources for the uplink transmission. In some cases, the grant of resources indicates frequency resources for the uplink transmission allocated based on a position of the UE 115 relative to one or more other UEs 115. In some cases, the grant receiver 730 may be a processor (e.g., a transceiver processor, or a radio processor, or a receiver processor). The processor may be coupled with memory and execute instructions stored in the memory that enable the processor to perform or facilitate the interference management features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

Figure 8:
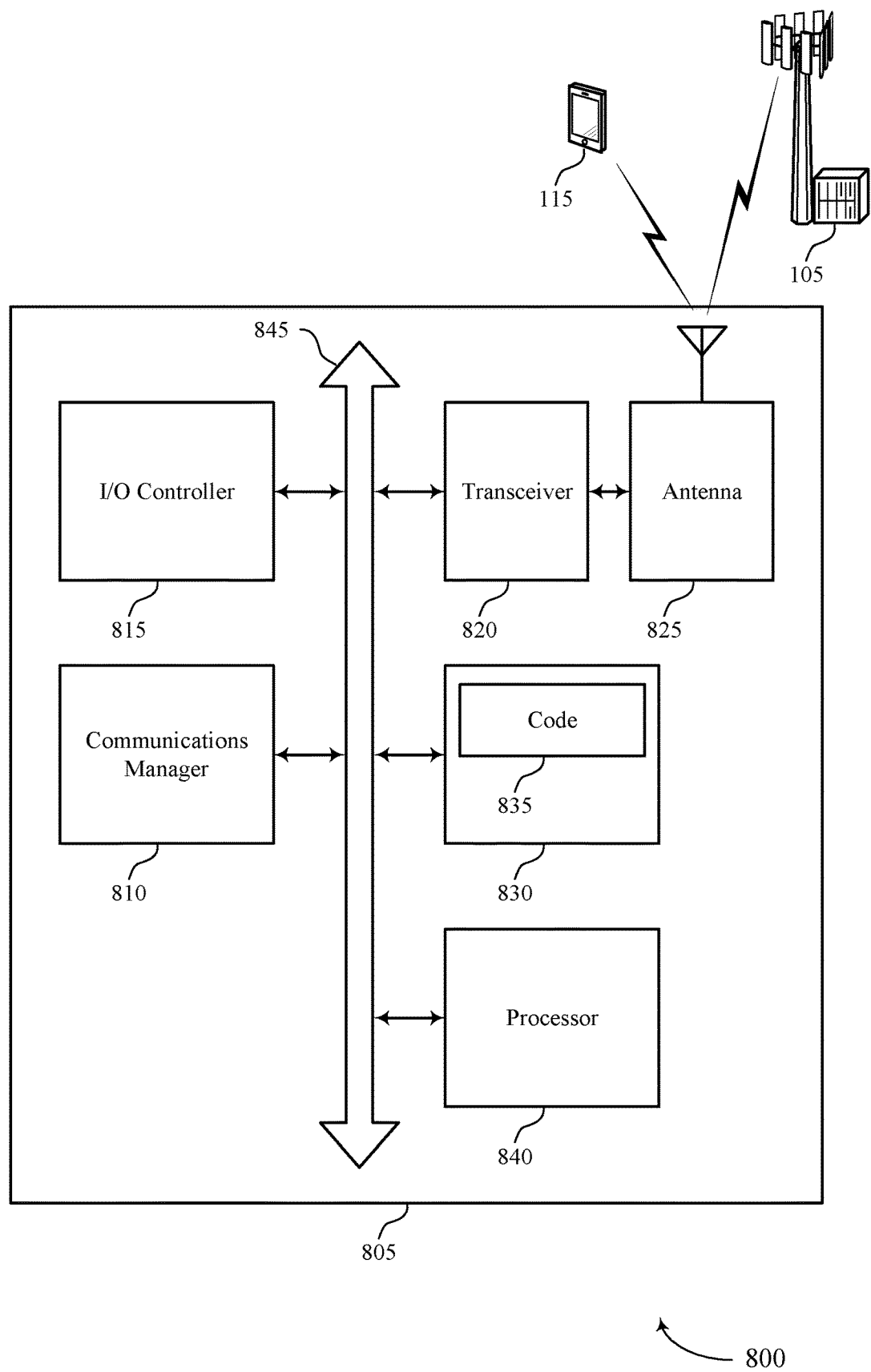
FIG. 8 shows a diagram of a system including a device that supports IBE interference management in accordance with aspects of the present disclosure.

FIG. 8 shows a diagram of a system 800 including a device 805 that supports IBE interference management in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station 105, DCI that indicates an IBE mask for the UE 115, map the indicated IBE mask to a MPR, determine, based on the MPR, a transmission power for the UE 115, and transmit, according to the determined transmission power and the received DCI, an uplink transmission to the base station 105. In some cases, the communications manager 810 may be a processor. The processor may be coupled with memory and execute instructions stored in the memory that enable the processor to perform or facilitate the interference management features discussed herein.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting IBE interference management).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
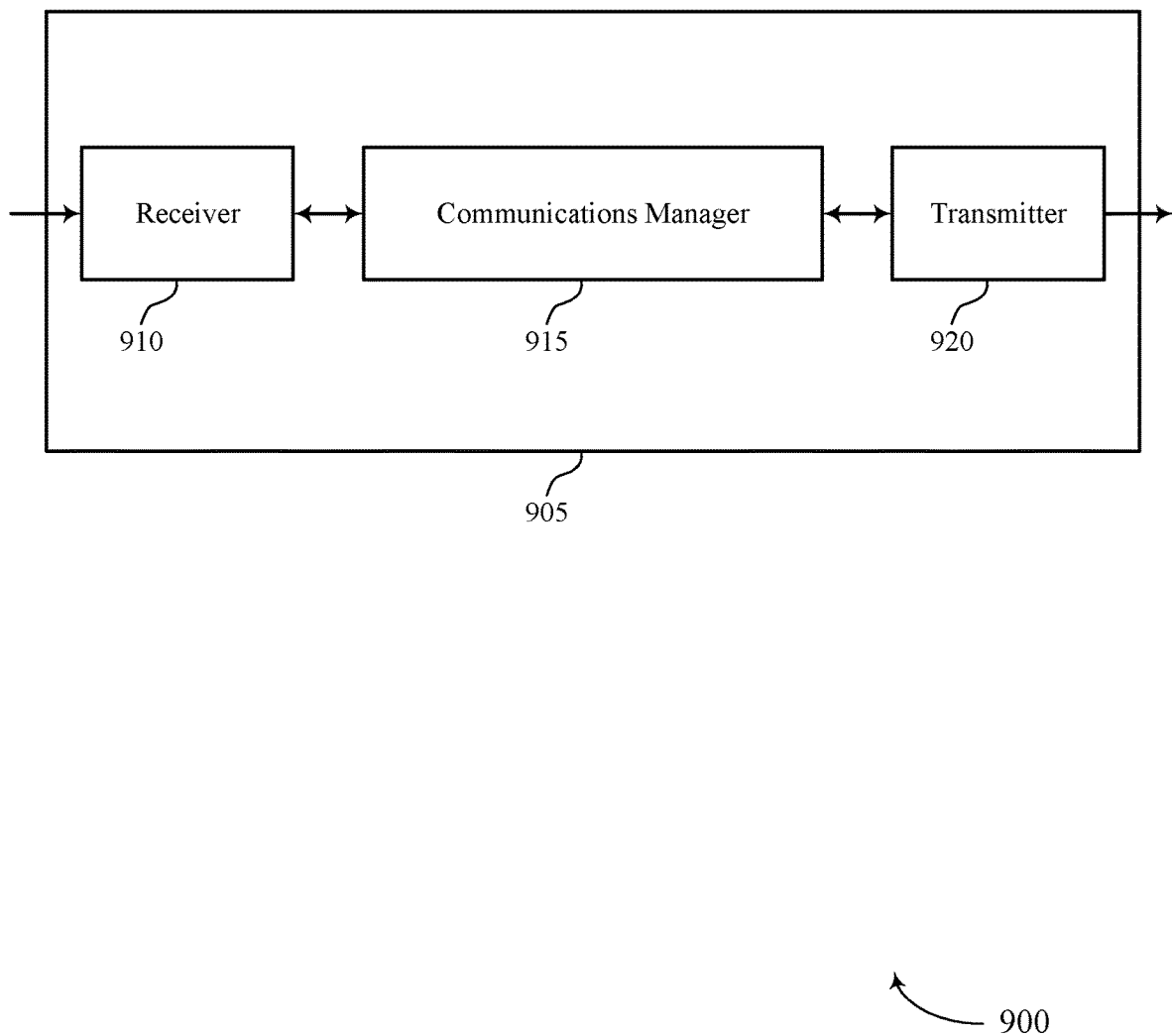
FIGS. 9 and 10 show block diagrams of devices that support IBE interference management in accordance with aspects of the present disclosure.

FIG. 9 shows a block diagram 900 of a device 905 that supports IBE interference management in accordance with aspects of the present disclosure. The device 905 may be an example of aspects of a base station 105 as described herein. The device 905 may include a receiver 910, a communications manager 915, and a transmitter 920. The device 905 may also include one or more processors, memory coupled with the one or more processors, and instructions stored in the memory that are executable by the one or more processors to enable the one or more processors to perform the interference management features discussed herein. Each of these components may be in communication with one another (e.g., via one or more buses).

The receiver 910 may receive information such as packets, user data, or control information associated with various information channels (e.g., control channels, data channels, and information related to IBE interference management, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine an IBE mask for a UE 115, the UE 115 being one of a set of UEs 115 to be scheduled by the base station 105 for uplink transmissions during a TTI and transmit, to the UE 115, DCI that indicates the determined IBE mask for an uplink transmission by the UE 115. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. The processor may be coupled with memory and execute instructions stored in the memory that enable the processor to perform or facilitate the interference management features discussed herein.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
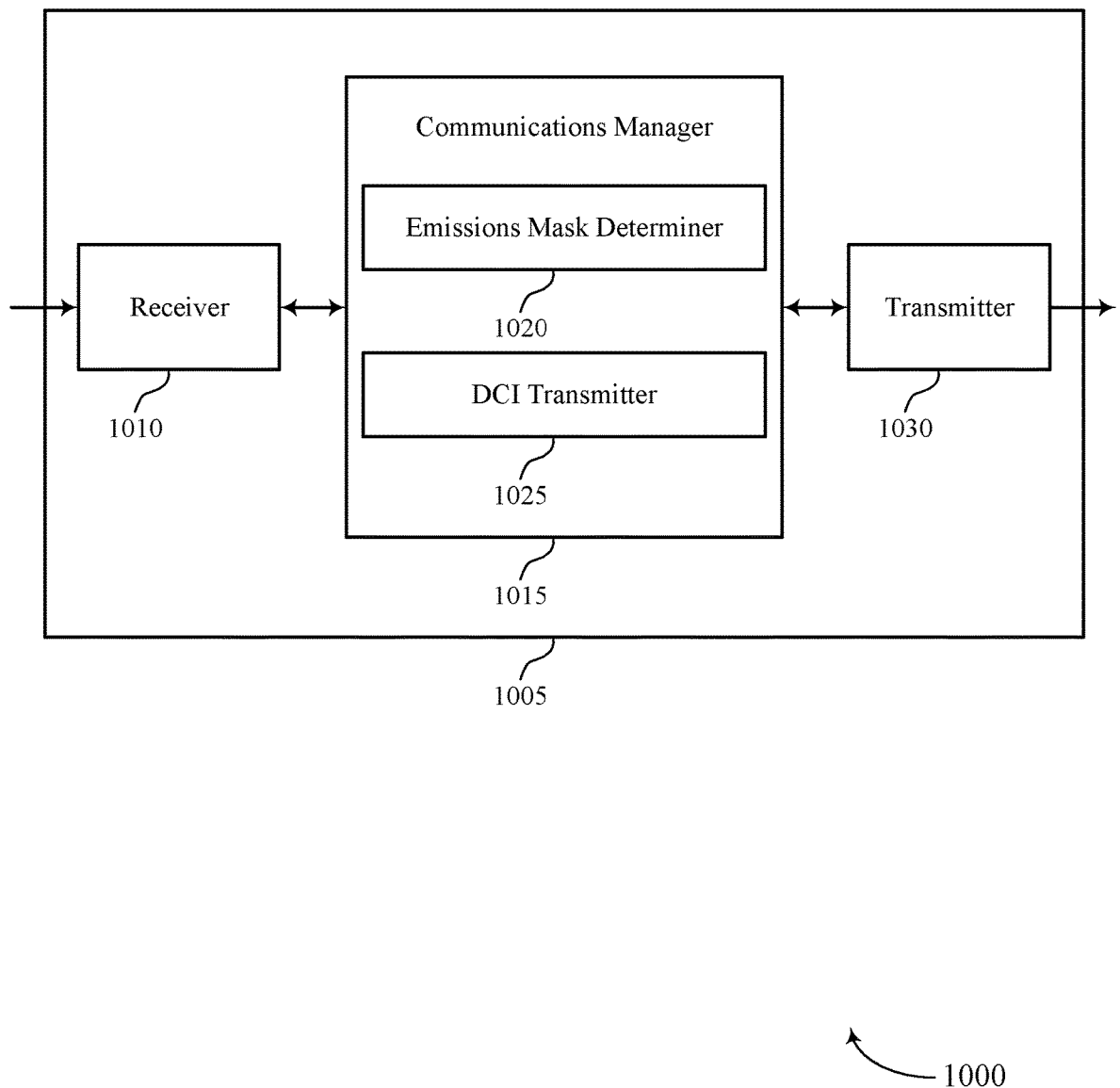

FIG. 10 shows a block diagram 1000 of a device 1005 that supports IBE interference management in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to IBE interference management, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an emissions mask determiner 1020 and a DCI transmitter 1025. The communications manager 1015 may be an example of aspects of the communications manager 1210 described herein. In some cases, the communications manager 1015 may be a processor. The processor may be coupled with memory and execute instructions stored in the memory that enable the processor to perform or facilitate the interference management features discussed herein.

The emissions mask determiner 1020 may determine an IBE mask for a UE 115, the UE 115 being one of a set of UEs 115 to be scheduled by the base station 105 for uplink transmissions during a TTI. In some cases, the emissions mask determiner 1020 may be a processor. The processor may be coupled with memory and execute instructions stored in the memory that enable the processor to perform or facilitate the interference management features discussed herein.

The DCI transmitter 1025 may transmit, to the UE 115, DCI that indicates the determined IBE mask for an uplink transmission by the UE 115. In some cases, the DCI transmitter 1025 may be a processor (e.g., a transceiver processor, or a radio processor, or a transmitter processor). The processor may be coupled with memory and execute instructions stored in the memory that enable the processor to perform or facilitate the interference management features discussed herein. A transmitter processor may be collocated with and/or communicate with (e.g., direct the operations of) a transmitter of the device.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
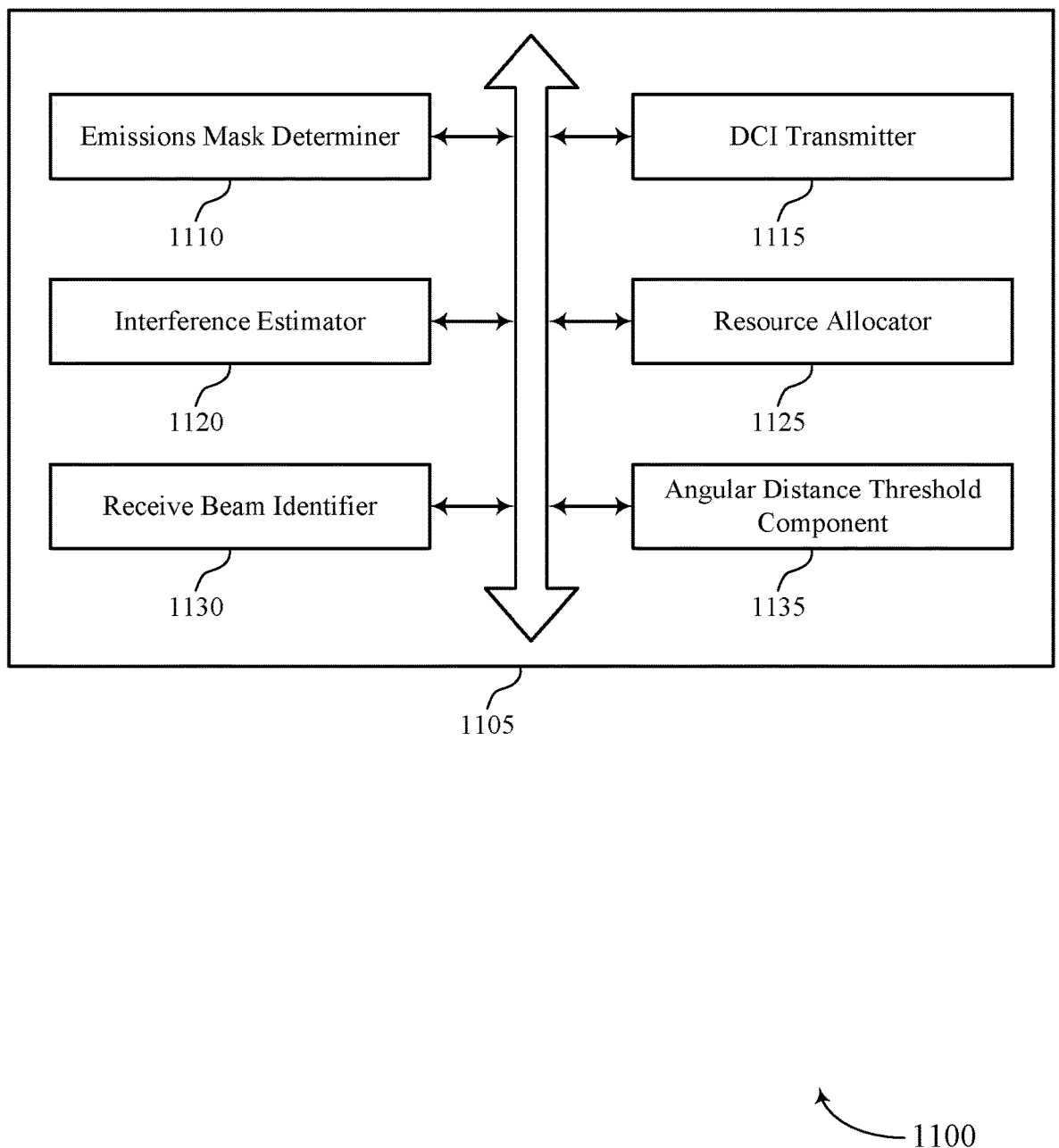
FIG. 11 shows a block diagram of a communications manager that supports IBE interference management in accordance with aspects of the present disclosure.

FIG. 11 shows a block diagram 1100 of a communications manager 1105 that supports IBE interference management in accordance with aspects of the present disclosure. The communications manager 1105 may be an example of aspects of a communications manager 915, a communications manager 1015, or a communications manager 1210 described herein. The communications manager 1105 may include an emissions mask determiner 1110, a DCI transmitter 1115, an interference estimator 1120, a resource allocator 1125, a receive beam identifier 1130, and an angular distance threshold component 1135. Each of these modules may communicate, directly or indirectly, with one another (e.g., via one or more buses). In some cases, the communications manager 1105 may be a processor. The processor may be coupled with memory and execute instructions stored in the memory that enable the processor to perform or facilitate the interference management features discussed herein.

The emissions mask determiner 1110 may determine an IBE mask for a UE 115, the UE 115 being one of a set of UEs 115 to be scheduled by the base station 105 for uplink transmissions during a TTI. In some examples, the emissions mask determiner 1110 may identify a number of the set of UEs 115 to be scheduled by the base station 105 during the TTI. In some examples, the emissions mask determiner 1110 may determine the IBE mask for the UE 115 based on the identified number. In some examples, the emissions mask determiner 1110 may determine the IBE mask for the UE 115 based on the estimated level of IBE interference. In some cases, the IBE mask is proportional to the number of the set of UEs 115 to be scheduled by the base station 105 during the TTI. In some cases, the emissions mask determiner 1110 may be a processor. The processor may be coupled with memory and execute instructions stored in the memory that enable the processor to perform or facilitate the interference management features discussed herein.

The DCI transmitter 1115 may transmit, to the UE 115, DCI that indicates the determined IBE mask for an uplink transmission by the UE 115. In some cases, the DCI transmitter 1115 may be a processor (e.g., a transceiver processor, or a radio processor, or a transmitter processor). The processor may be coupled with memory and execute instructions stored in the memory that enable the processor to perform or facilitate the interference management features discussed herein. A transmitter processor may be collocated with and/or communicate with (e.g., direct the operations of) a transmitter of the device.

The interference estimator 1120 may estimate a level of IBE interference during the TTI (e.g., a level of IBE interference during the TTI proportional to a number of the plurality of UEs 115 scheduled by the base station 105 for uplink transmissions during the TTI). In some cases, the interference estimator 1120 may be a processor. The processor may be coupled with memory and execute instructions stored in the memory that enable the processor to perform or facilitate the interference management features discussed herein.

The resource allocator 1125 may allocate frequency resources for the UE 115 based on a position of the UE 115 relative to at least one of the set of UEs 115, where the transmitted DCI indicates the allocated frequency resources. In some examples, the resource allocator 1125 may allocate frequency resources for the UE 115 that are non-contiguous with frequency resources allocated to any other UE 115 of the set of UEs 115. In some examples, the resource allocator 1125 may allocate, based on the identification, first frequency resources for the UE 115 that are non-contiguous with second frequency resources allocated for the second UE 115. In some examples, the resource allocator 1125 may allocate, based on the identification, first frequency resources for the UE 115 that are contiguous with second frequency resources allocated for the second UE 115. In some cases, the resource allocator 1125 may be a processor. The processor may be coupled with memory and execute instructions stored in the memory that enable the processor to perform or facilitate the interference management features discussed herein.

The receive beam identifier 1130 may identify, from the set of UEs 115, a set of UEs 115 associated with a receive beam of the base station 105, the UE 115 being one of the set of UEs 115. In some cases, each UE 115 of the set of UEs 115 is allocated frequency resources that are non-contiguous with frequency resources allocated for any other UE 115 of the set of UEs 115. In some cases, the receive beam identifier 1130 may be a processor. The processor may be coupled with memory and execute instructions stored in the memory that enable the processor to perform or facilitate the interference management features discussed herein.

The angular distance threshold component 1135 may identify that the UE 115 and a second UE 115 of the set of UEs 115 are separated by an angular distance that is less than or equal to a predetermined threshold angular distance. In some examples, the angular distance threshold component 1135 may identify that the UE 115 and a second UE 115 of the set of UEs 115 are separated by an angular distance that is greater than or equal to a predetermined threshold angular distance. In some cases, the angular distance threshold component 1135 may be a processor. The processor may be coupled with memory and execute instructions stored in the memory that enable the processor to perform or facilitate the interference management features discussed herein.

Figure 12:
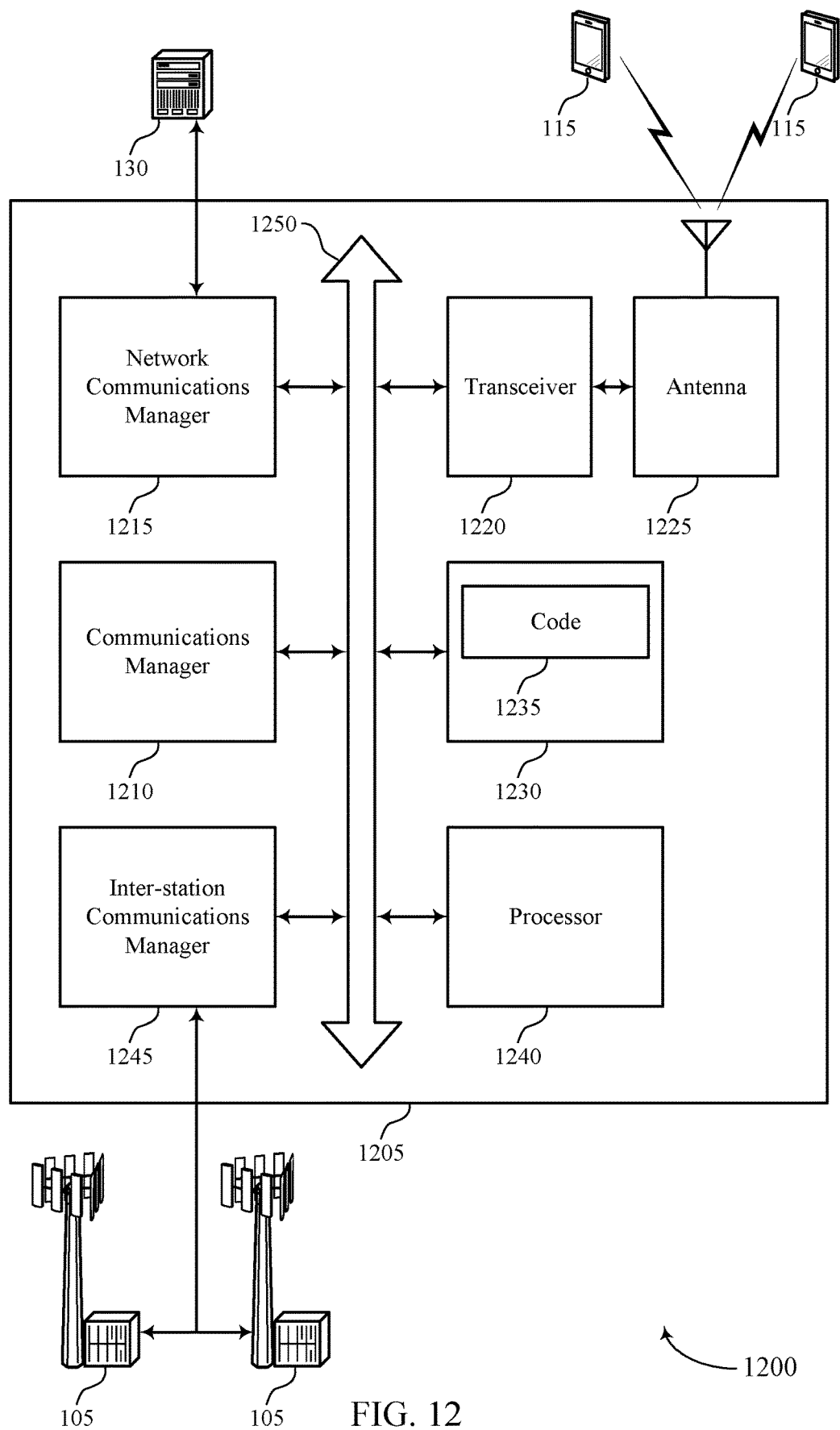
FIG. 12 shows a diagram of a system including a device that supports IBE interference management in accordance with aspects of the present disclosure.

FIG. 12 shows a diagram of a system 1200 including a device 1205 that supports IBE interference management in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine an IBE mask for a UE 115, the UE 115 being one of a set of UEs 115 to be scheduled by the base station 105 for uplink transmissions during a TTI and transmit, to the UE 115, DCI that indicates the determined IBE mask for an uplink transmission by the UE 115. In some cases, the communications manager 1210 may be a processor. The processor may be coupled with memory and execute instructions stored in the memory that enable the processor to perform or facilitate the interference management features discussed herein.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting IBE interference management).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
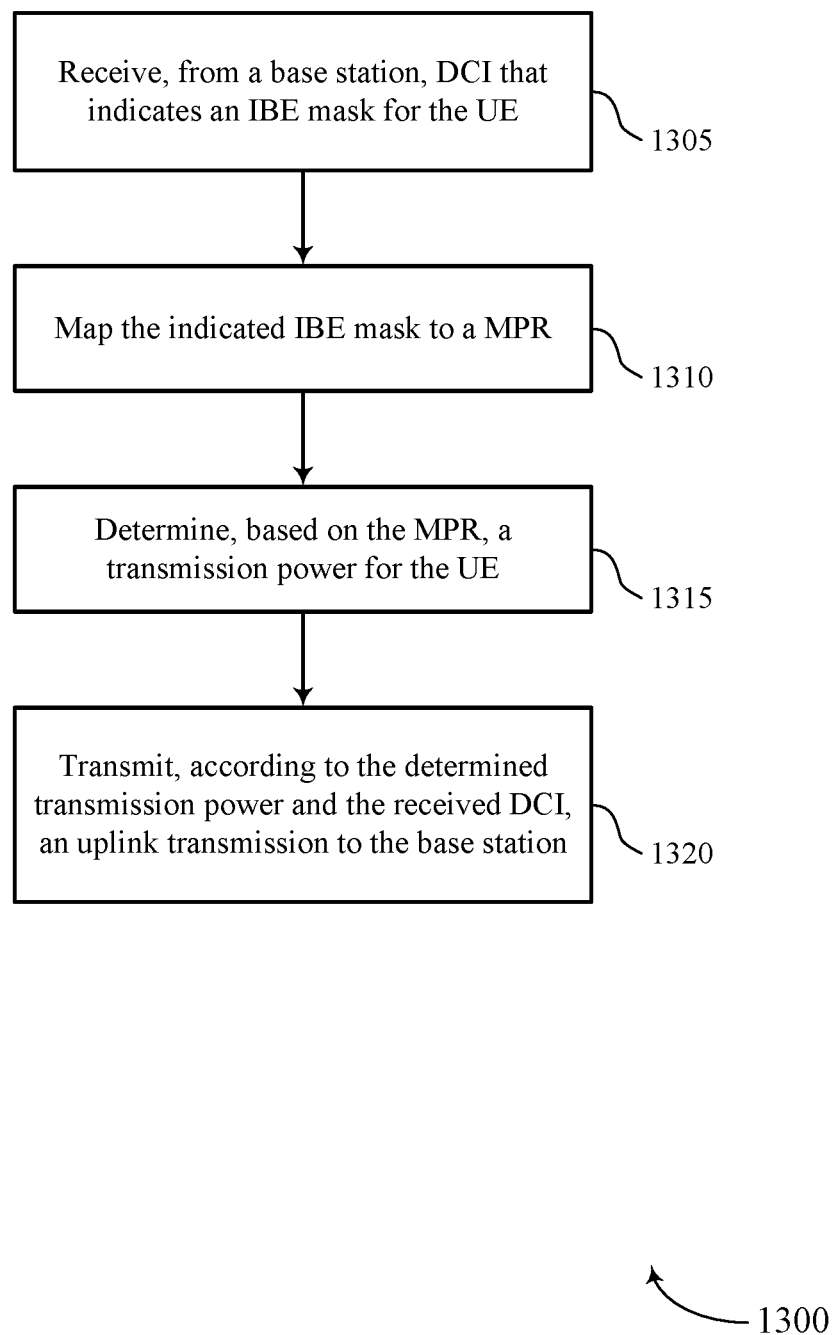
FIGS. 13 through 17 show flowcharts illustrating methods that support IBE interference management in accordance with aspects of the present disclosure.

FIG. 13 shows a flowchart illustrating a method 1300 that supports IBE interference management in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE 115 may execute a set of instructions to control the functional elements of the UE 115 to perform the functions described below. Additionally or alternatively, a UE 115 may perform aspects of the functions described below using special-purpose hardware.

At 1305, the UE 115 may receive, from a base station 105, DCI that indicates an IBE mask for the UE 115. The operations of 1305 may be performed according to the methods described herein. In some examples, aspects of the operations of 1305 may be performed by a DCI receiver as described with reference to FIGS. 5 through 8.

At 1310, the UE 115 may map the indicated IBE mask to a MPR. The operations of 1310 may be performed according to the methods described herein. In some examples, aspects of the operations of 1310 may be performed by an emissions mask mapper as described with reference to FIGS. 5 through 8.

At 1315, the UE 115 may determine, based on the MPR, a transmission power for the UE 115. The operations of 1315 may be performed according to the methods described herein. In some examples, aspects of the operations of 1315 may be performed by a transmission power determiner as described with reference to FIGS. 5 through 8.

At 1320, the UE 115 may transmit, according to the determined transmission power and the received DCI, an uplink transmission to the base station 105. The operations of 1320 may be performed according to the methods described herein. In some examples, aspects of the operations of 1320 may be performed by an uplink transmission transmitter as described with reference to FIGS. 5 through 8.

Figure 14:
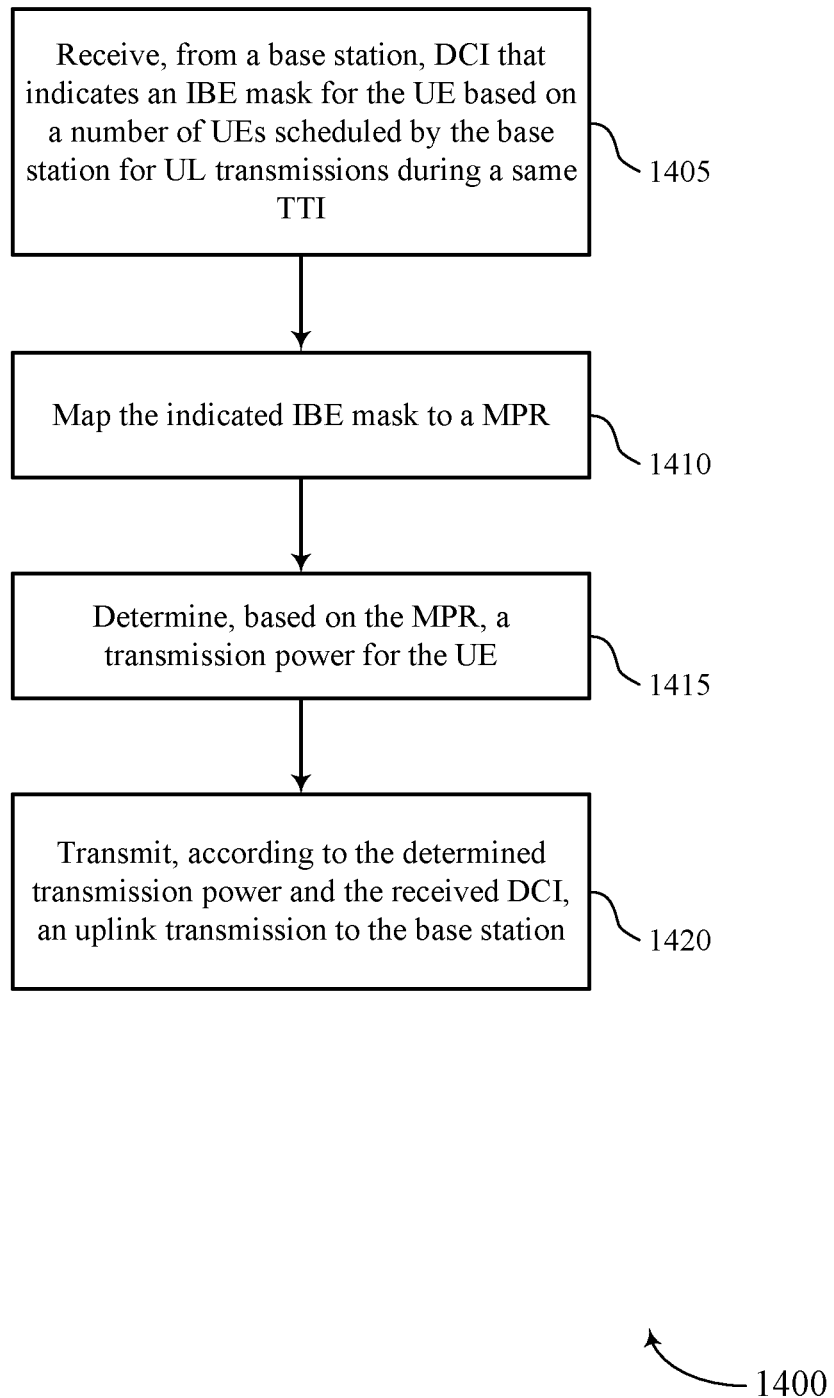

FIG. 14 shows a flowchart illustrating a method 1400 that supports IBE interference management in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE 115 may execute a set of instructions to control the functional elements of the UE 115 to perform the functions described below. Additionally or alternatively, a UE 115 may perform aspects of the functions described below using special-purpose hardware.

At 1405, the UE 115 may receive, from a base station 105, DCI that indicates an IBE mask for the UE 115 based on a number of UEs 115 scheduled by the base station 105 for uplink transmissions during a same TTI. The operations of 1405 may be performed according to the methods described herein. In some examples, aspects of the operations of 1405 may be performed by a DCI receiver as described with reference to FIGS. 5 through 8.

At 1410, the UE 115 may map the indicated IBE mask to a MPR. The operations of 1415 may be performed according to the methods described herein. In some examples, aspects of the operations of 1415 may be performed by an emissions mask mapper as described with reference to FIGS. 5 through 8.

At 1415, the UE 115 may determine, based on the MPR, a transmission power for the UE 115. The operations of 1420 may be performed according to the methods described herein. In some examples, aspects of the operations of 1420 may be performed by a transmission power determiner as described with reference to FIGS. 5 through 8.

At 1420, the UE 115 may transmit, according to the determined transmission power and the received DCI, an uplink transmission to the base station 105. The operations of 1425 may be performed according to the methods described herein. In some examples, aspects of the operations of 1425 may be performed by an uplink transmission transmitter as described with reference to FIGS. 5 through 8.

Figure 15:
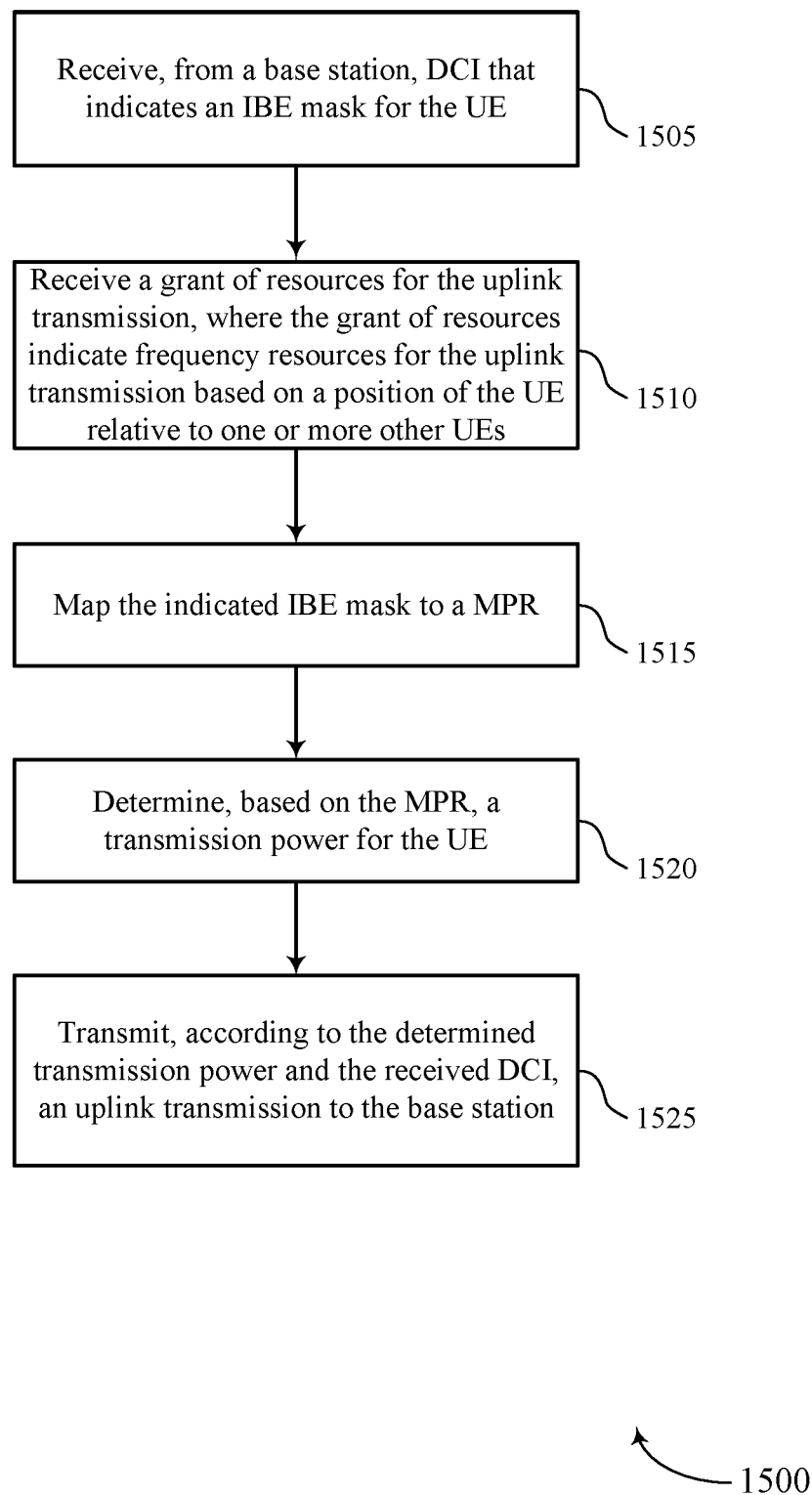

FIG. 15 shows a flowchart illustrating a method 1500 that supports IBE interference management in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE 115 may execute a set of instructions to control the functional elements of the UE 115 to perform the functions described below. Additionally or alternatively, a UE 115 may perform aspects of the functions described below using special-purpose hardware.

At 1505, the UE 115 may receive, from a base station 105, DCI that indicates an IBE mask for the UE 115. The operations of 1505 may be performed according to the methods described herein. In some examples, aspects of the operations of 1505 may be performed by a DCI receiver as described with reference to FIGS. 5 through 8.

At 1510, the UE 115 may receive a grant of resources for the uplink transmission, where the grant of resources indicate frequency resources for the uplink transmission based on a position of the UE 115 relative to one or more other UEs 115. The operations of 1510 may be performed according to the methods described herein. In some examples, aspects of the operations of 1510 may be performed by a grant receiver as described with reference to FIGS. 5 through 8.

At 1515, the UE 115 may map the indicated IBE mask to a MPR. The operations of 1515 may be performed according to the methods described herein. In some examples, aspects of the operations of 1515 may be performed by an emissions mask mapper as described with reference to FIGS. 5 through 8.

At 1520, the UE 115 may determine, based on the MPR, a transmission power for the UE 115. The operations of 1520 may be performed according to the methods described herein. In some examples, aspects of the operations of 1520 may be performed by a transmission power determiner as described with reference to FIGS. 5 through 8.

At 1525, the UE 115 may transmit, according to the determined transmission power and the received DCI, an uplink transmission to the base station 105. The operations of 1525 may be performed according to the methods described herein. In some examples, aspects of the operations of 1525 may be performed by an uplink transmission transmitter as described with reference to FIGS. 5 through 8.

Figure 16:
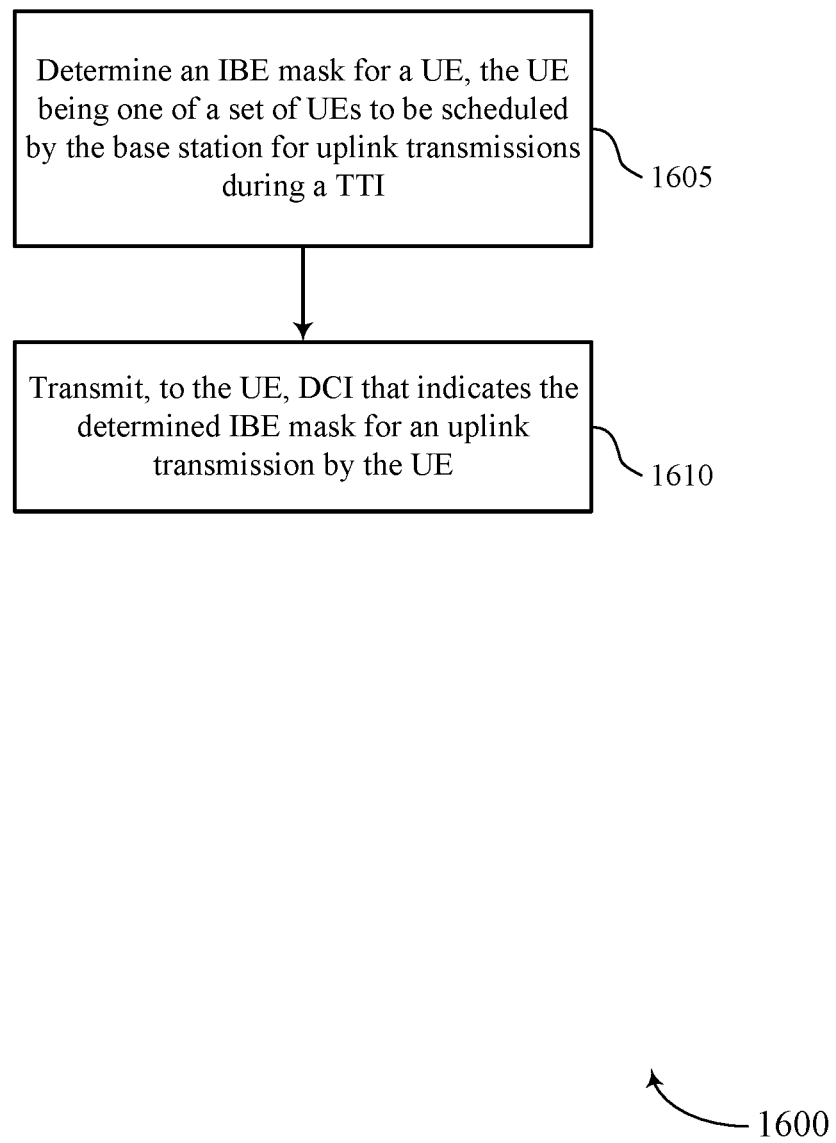

FIG. 16 shows a flowchart illustrating a method 1600 that supports IBE interference management in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station 105 may execute a set of instructions to control the functional elements of the base station 105 to perform the functions described below. Additionally or alternatively, a base station 105 may perform aspects of the functions described below using special-purpose hardware.

At 1605, the base station 105 may determine an IBE mask for a UE 115, the UE 115 being one of a set of UEs 115 to be scheduled by the base station 105 for uplink transmissions during a TTI. The operations of 1605 may be performed according to the methods described herein. In some examples, aspects of the operations of 1605 may be performed by an emissions mask determiner as described with reference to FIGS. 9 through 12.

At 1610, the base station 105 may transmit, to the UE 115, DCI that indicates the determined IBE mask for an uplink transmission by the UE 115. The operations of 1610 may be performed according to the methods described herein. In some examples, aspects of the operations of 1610 may be performed by a DCI transmitter as described with reference to FIGS. 9 through 12.

Figure 17:
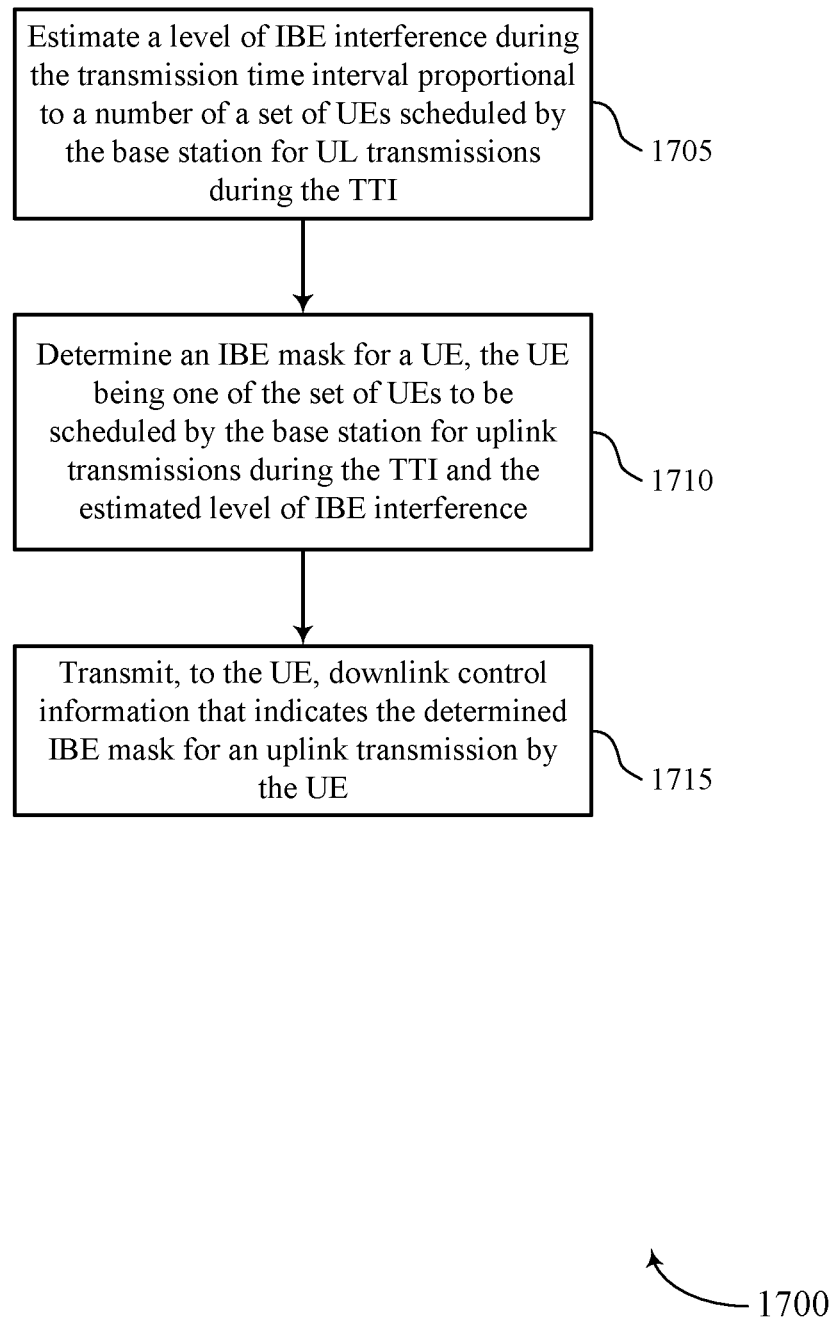

FIG. 17 shows a flowchart illustrating a method 1700 that supports IBE interference management in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station 105 may execute a set of instructions to control the functional elements of the base station 105 to perform the functions described below. Additionally or alternatively, a base station 105 may perform aspects of the functions described below using special-purpose hardware.

At 1705, the base station 105 may estimate a level of IBE interference during the TTI proportional to a number of a set of UEs 115 scheduled by the base station 105 for uplink transmissions during the TTI. The operations of 1705 may be performed according to the methods described herein. In some examples, aspects of the operations of 1705 may be performed by an interference estimator as described with reference to FIGS. 9 through 12.

At 1710, the base station 105 may determine an IBE mask for a UE, the UE being one of the set of UEs to be scheduled by the base station for uplink transmissions during the TTI and the estimated level of IBE interference. The operations of 1710 may be performed according to the methods described herein. In some examples, aspects of the operations of 1710 may be performed by an emissions mask determiner as described with reference to FIGS. 9 through 12.

At 1715, the base station 105 may transmit, to the UE 115, DCI that indicates the determined IBE mask for an uplink transmission by the UE 115. The operations of 1715 may be performed according to the methods described herein. In some examples, aspects of the operations of 1715 may be performed by a DCI transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, downlink control information that comprises an indication of an in-band emission (IBE) mask for the UE;
   mapping the indicated IBE mask to a maximum power reduction;
   determining, based at least in part on the maximum power reduction, a transmission power for the UE; and
   transmitting, according to the determined transmission power and the received downlink control information, an uplink transmission to the base station.

2. The method of claim 1, wherein receiving the downlink control information comprises:
receiving the downlink control information that comprises an indication of the IBE mask based at least in part on a number of UEs scheduled by the base station for uplink transmissions during a same transmission time interval.

3. The method of claim 2, wherein the indicated IBE mask is proportional to the number of UEs scheduled by the base station for uplink transmissions during the same transmission time interval.

4. The method of claim 1, wherein receiving the downlink control information comprises:
receiving the downlink control information that comprises an indication of the IBE mask based at least in part on an estimation of a level of IBE interference for a transmission time interval of the uplink transmission proportional to a number of UEs scheduled by the base station for uplink transmissions during the transmission time interval.

5. The method of claim 4, wherein mapping the indicated IBE mask to the maximum power reduction comprises:
mapping the indicated IBE mask to the maximum power reduction according to a predetermined mapping.

6. The method of claim 1, wherein receiving the downlink control information further comprises:
receiving a grant of resources for the uplink transmission.

7. The method of claim 6, wherein the grant of resources indicates frequency resources for the uplink transmission allocated based at least in part on a position of the UE relative to one or more other UEs.

8. The method of claim 1, wherein determining the transmission power for the UE comprises:
determining the transmission power for the UE based at least in part on a maximum output power and the maximum power reduction.

9. The method of claim 1, wherein the uplink transmission comprises a multi-user uplink transmission.

10. A method for wireless communication at a base station, comprising:
determining an in-band emission (IBE) mask for a user equipment (UE), the UE being one of a plurality of UEs to be scheduled by the base station for uplink transmissions during a transmission time interval;
transmitting, to the UE, downlink control information that comprises an indication of the determined IBE mask that is mappable to a maximum power reduction for an uplink transmission by the UE; and
receiving the uplink transmission having a transmission power based on the maximum power reduction.

11. The method of claim 10, wherein determining the IBE mask for the UE comprises:
identifying a number of the plurality of UEs to be scheduled by the base station during the transmission time interval; and
determining the IBE mask for the UE based at least in part on the identified number.

12. The method of claim 11, wherein the IBE mask is proportional to the number of the plurality of UEs to be scheduled by the base station during the transmission time interval.

13. The method of claim 10, wherein determining the IBE mask for the UE comprises:
estimating a level of IBE interference during the transmission time interval proportional to a number of the plurality of UEs scheduled by the base station for uplink transmissions during the transmission time interval; and
determining the IBE mask for the UE based at least in part on the estimated level of IBE interference.

14. The method of claim 10, further comprising:
allocating frequency resources for the UE based at least in part on a position of the UE relative to at least one of the plurality of UEs, wherein the transmitted downlink control information indicates the allocated frequency resources.

15. The method of claim 10, further comprising:
identifying, from the plurality of UEs, a set of UEs associated with a receive beam of the base station, the UE being one of the set of UEs; and
allocating frequency resources for the UE that are non-contiguous with frequency resources allocated to any other UE of the set of UEs.

16. The method of claim 15, wherein each UE of the set of UEs is allocated frequency resources that are non-contiguous with frequency resources allocated for any other UE of the set of UEs.

17. The method of claim 10, further comprising:
identifying that the UE and a second UE of the plurality of UEs are separated by an angular distance that is less than or equal to a threshold angular distance; and
allocating, based at least in part on the identification, first frequency resources for the UE that are non-contiguous with second frequency resources allocated for the second UE.

18. The method of claim 10, further comprising:
identifying that the UE and a second UE of the plurality of UEs are separated by an angular distance that is greater than or equal to a threshold angular distance; and
allocating, based at least in part on the identification, first frequency resources for the UE that are contiguous with second frequency resources allocated for the second UE.

19. An apparatus for wireless communication at a user equipment (UE), comprising:
a processor,
memory coupled with the processor; and
instructions stored in the memory and operable, when executed by the processor, to cause the apparatus to:
receive, from a base station, downlink control information that comprises an indication of an in-band emission (IBE) mask for the UE;
map the indicated IBE mask to a maximum power reduction;
determine, based at least in part on the maximum power reduction, a transmission power for the UE; and
transmit, according to the determined transmission power and the received downlink control information, an uplink transmission to the base station.

20. The apparatus of claim 19, wherein the instructions are further executable by the processor to receive the downlink control information by being executable by the processor to:
receive the downlink control information that comprises an indication of the IBE mask based at least in part on a number of UEs scheduled by the base station for uplink transmissions during a same transmission time interval.

21. The apparatus of claim 19, wherein the instructions are further executable by the processor to receive the downlink control information by being executable by the processor to:
receive the downlink control information that comprises an indication of the IBE mask based at least in part on an estimation of a level of IBE interference for a transmission time interval of the uplink transmission proportional to a number of UEs scheduled by the base station for uplink transmissions during the transmission time interval.

22. The apparatus of claim 19, wherein the instructions are further executable by the processor to receive the downlink control information by being executable by the processor to:
receive a grant of resources for the uplink transmission.

23. The apparatus of claim 19, wherein the instructions are further executable by the processor to determine the transmission power for the UE by being executable by the processor to:
determine the transmission power for the UE based at least in part on a maximum output power and the maximum power reduction.

24. An apparatus for wireless communication at a base station, comprising:
a processor,
memory coupled with the processor; and
instructions stored in the memory and operable, when executed by the processor, to cause the apparatus to:
determine an in-band emission (IBE) mask for a user equipment (UE), the UE being one of a plurality of UEs to be scheduled by the base station for uplink transmissions during a transmission time interval;
transmit, to the UE, downlink control information that comprises an indication of the determined IBE mask that is mappable to a maximum power reduction for an uplink transmission by the UE; and
receive the uplink transmission having a transmission power based on the maximum power reduction.

25. The apparatus of claim 24, wherein the instructions are further executable by the processor to determine the IBE mask for the UE by being executable by the processor to:
identify a number of the plurality of UEs to be scheduled by the base station during the transmission time interval; and
determine the IBE mask for the UE based at least in part on the identified number.

26. The apparatus of claim 24, wherein the instructions are further executable by the processor to determine the IBE mask for the UE by being executable by the processor to:
estimate a level of IBE interference during the transmission time interval; and
determine the IBE mask for the UE based at least in part on the estimated level of IBE interference proportional to a number of the plurality of UEs scheduled by the base station for uplink transmissions during the transmission time interval.

27. The apparatus of claim 24, wherein the instructions are further executable by the processor to:
allocate frequency resources for the UE based at least in part on a position of the UE relative to at least one of the plurality of UEs, wherein the transmitted downlink control information indicates the allocated frequency resources.

28. The apparatus of claim 24, wherein the instructions are further executable by the processor to:
identify, from the plurality of UEs, a set of UEs associated with a receive beam of the base station, the UE being one of the set of UEs; and
allocate frequency resources for the UE that are non-contiguous with frequency resources allocated to any other UE of the set of UEs.

29. The apparatus of claim 24, wherein the instructions are further executable by the processor to:
identify that the UE and a second UE of the plurality of UEs are separated by an angular distance that is less than or equal to a predetermined threshold angular distance; and
allocate, based at least in part on the identification, first frequency resources for the UE that are non-contiguous with second frequency resources allocated for the second UE.

30. The apparatus of claim 24, wherein the instructions are further executable by the processor to:
identify that the UE and a second UE of the plurality of UEs are separated by an angular distance that is greater than or equal to a predetermined threshold angular distance; and
allocate, based at least in part on the identification, first frequency resources for the UE that are contiguous with second frequency resources allocated for the second UE.

* * * * *